(12) United States Patent
Wood et al.

(10) Patent No.: US 7,764,777 B2
(45) Date of Patent: Jul. 27, 2010

(54) BRANCH CALLING AND CALLER ID BASED CALL ROUTING TELEPHONE FEATURES

(75) Inventors: Samuel F. Wood, Los Altos Hills, CA (US); Jerry A. Klein, Los Altos, CA (US); Margaret Susan Asprey, Los Altos, CA (US)

(73) Assignee: Telemaze LLC, Los Altos, CA (US)

( * ) Notice: Subject to any disclaimer, the term of this patent is extended or adjusted under 35 U.S.C. 154(b) by 0 days.

(21) Appl. No.: 11/948,965

(22) Filed: Nov. 30, 2007

(65) Prior Publication Data

US 2008/0075262 A1     Mar. 27, 2008

Related U.S. Application Data

(60) Division of application No. 10/426,279, filed on Apr. 30, 2003, now Pat. No. 7,324,635, which is a continuation-in-part of application No. 09/565,565, filed on May 4, 2000, now Pat. No. 6,574,328.

(51) Int. Cl.
*H04M 7/00* (2006.01)
(52) U.S. Cl. .............................. 379/220.01; 379/221.01
(58) Field of Classification Search ............ 379/211.04, 379/220.01, 221.02, 201.01
See application file for complete search history.

(56) References Cited

U.S. PATENT DOCUMENTS 4,100,377 A    7/1978   Flanagan (Continued)

FOREIGN PATENT DOCUMENTS

DE     19813179     9/1999

(Continued)

OTHER PUBLICATIONS

ADC Telecommunications; SS7 New Net SS7 Tutorial; © Copyright 1999.

(Continued)

*Primary Examiner*—Creighton Smith
(74) *Attorney, Agent, or Firm*—Berry & Associates P.C.

(57) ABSTRACT

A caller ID based call routing feature is described for blocked and non-blocked caller ID's. A processing system in the public switched telephone network (PSTN) receives first identifying information for identify the source of a telephone call and associates additional information stored in a memory with the first identifying information. The additional information may be information about the calling party initially downloaded to the memory by a subscriber. Once retrieved from the memory by the processing system, the additional information may then be transmitted to the subscriber via the Internet for display on a monitor or to the subscriber's telephone for display on a telephone display. Another feature described is a branch calling feature where the subscriber may program a processing system within the PSTN to forward an incoming call to two or more end units (e.g., telephones) simultaneously. If the call at an end unit is answered, answer supervision signaling is transmitted back to the processing system which then terminates all other calls. The processing system then connects the calling party to the subscriber. The branch calling may be made for any combination of local, long distance, and cellular telephone numbers.

46 Claims, 11 Drawing Sheets

U.S. PATENT DOCUMENTS

| | | |
|---|---|---|
| 4,238,851 A | 12/1980 | Takahashi et al. |
| 4,313,035 A | 1/1982 | Jordan et al. |
| 4,348,554 A | 9/1982 | Asmuth |
| 4,569,041 A | 2/1986 | Takeuchi et al. |
| 4,608,685 A | 8/1986 | Jain et al. |
| 4,611,094 A | 9/1986 | Asmuth et al. |
| 4,611,096 A | 9/1986 | Asmuth et al. |
| 4,630,260 A | 12/1986 | Toy et al. |
| 4,630,262 A | 12/1986 | Callens et al. |
| 4,661,947 A | 4/1987 | Lea et al. |
| 4,674,082 A | 6/1987 | Flanagin et al. |
| 4,679,190 A | 7/1987 | Dias et al. |
| 4,679,191 A | 7/1987 | Nelson et al. |
| 4,707,831 A | 11/1987 | Weir et al. |
| 4,715,026 A | 12/1987 | Eberspaecher |
| 4,723,238 A | 2/1988 | Isreal et al. |
| 4,757,497 A | 7/1988 | Beierle et al. |
| 4,761,779 A | 8/1988 | Nara et al. |
| 4,771,425 A | 9/1988 | Baran et al. |
| 4,815,071 A | 3/1989 | Shimizu |
| 4,819,228 A | 4/1989 | Baran et al. |
| 4,862,451 A | 8/1989 | Closs et al. |
| 4,866,704 A | 9/1989 | Bergman |
| 4,872,159 A | 10/1989 | Hemmady et al. |
| 4,872,160 A | 10/1989 | Hemmady et al. |
| 4,885,739 A | 12/1989 | Read et al. |
| 4,903,261 A | 2/1990 | Baran et al. |
| 4,926,416 A | 5/1990 | Weik |
| 4,932,022 A | 6/1990 | Keeney et al. |
| 4,933,931 A | 6/1990 | Kokubo |
| 4,953,158 A | 8/1990 | Schreur |
| 4,953,198 A | 8/1990 | Daly et al. |
| 4,958,341 A | 9/1990 | Hemmady et al. |
| 4,962,497 A | 10/1990 | Ferenc et al. |
| 4,969,184 A | 11/1990 | Gordon et al. |
| 4,970,721 A | 11/1990 | Aczel et al. |
| 4,973,837 A | 11/1990 | Bradbeer |
| 4,975,695 A | 12/1990 | Almond et al. |
| 4,996,685 A | 2/1991 | Farese et al. |
| 5,008,929 A | 4/1991 | Olsen et al. |
| 5,014,266 A | 5/1991 | Bales et al. |
| 5,018,136 A | 5/1991 | Gollub |
| 5,020,058 A | 5/1991 | Holden et al. |
| 5,022,071 A | 6/1991 | Mozer et al. |
| 5,048,081 A | 9/1991 | Gavaras et al. |
| 5,051,983 A | 9/1991 | Kammerl |
| 5,093,827 A | 3/1992 | Franklin et al. |
| 5,115,431 A | 5/1992 | Williams et al. |
| 5,150,357 A | 9/1992 | Hopner et al. |
| 5,157,662 A | 10/1992 | Tadamura et al. |
| 5,197,067 A | 3/1993 | Fujimoto et al. |
| 5,208,806 A | 5/1993 | Hasegawa |
| 5,218,602 A | 6/1993 | Grant et al. |
| 5,231,633 A | 7/1993 | Hluchyj et al. |
| 5,241,588 A | 8/1993 | Babson, III et al. |
| 5,247,571 A | 9/1993 | Kay et al. |
| 5,268,900 A | 12/1993 | Hluchyj et al. |
| 5,274,635 A | 12/1993 | Rahman et al. |
| 5,291,489 A | 3/1994 | Morgan et al. |
| 5,297,191 A | 3/1994 | Gerszberg |
| 5,301,189 A | 4/1994 | Schmidt et al. |
| 5,305,308 A | 4/1994 | English et al. |
| 5,311,582 A | 5/1994 | Davenport et al. |
| 5,327,428 A | 7/1994 | Van As et al. |
| 5,341,374 A | 8/1994 | Lewen et al. |
| 5,351,276 A | 9/1994 | Doll, Jr. et al. |
| 5,351,286 A | 9/1994 | Nici |
| 5,353,283 A | 10/1994 | Tsuchiya |
| 5,359,598 A | 10/1994 | Steagall et al. |
| 5,365,521 A | 11/1994 | Ohnishi et al. |
| 5,379,293 A | 1/1995 | Kanno et al. |
| 5,381,405 A | 1/1995 | Daugherty et al. |
| 5,381,466 A | 1/1995 | Shibayama et al. |
| 5,383,183 A | 1/1995 | Yoshida |
| 5,384,840 A | 1/1995 | Blatchford et al. |
| 5,390,184 A | 2/1995 | Morris |
| 5,396,491 A | 3/1995 | Newman |
| 5,420,858 A | 5/1995 | Marshall et al. |
| 5,422,882 A | 6/1995 | Hiller et al. |
| 5,423,003 A | 6/1995 | Berteau |
| 5,426,636 A | 6/1995 | Hiller et al. |
| 5,428,607 A | 6/1995 | Hiller et al. |
| 5,428,616 A | 6/1995 | Field et al. |
| 5,428,663 A | 6/1995 | Grimes et al. |
| 5,430,719 A | 7/1995 | Weisser, Jr. |
| 5,434,913 A | 7/1995 | Tung et al. |
| 5,436,898 A | 7/1995 | Bowen et al. |
| 5,438,614 A | 8/1995 | Rozman et al. |
| 5,444,709 A | 8/1995 | Riddle |
| 5,448,623 A | 9/1995 | Wiedeman et al. |
| 5,452,289 A | 9/1995 | Sharma et al. |
| 5,453,986 A | 9/1995 | Davis et al. |
| 5,455,853 A | 10/1995 | Cebulka et al. |
| 5,457,684 A | 10/1995 | Bharucha et al. |
| 5,471,470 A | 11/1995 | Sharma et al. |
| 5,471,616 A | 11/1995 | Johnson et al. |
| 5,479,411 A | 12/1995 | Klein |
| 5,485,457 A | 1/1996 | Aramaki |
| 5,495,567 A | 2/1996 | Iizawa et al. |
| 5,497,339 A | 3/1996 | Bernard |
| 5,521,914 A | 5/1996 | Mavraganis et al. |
| 5,526,353 A | 6/1996 | Henley et al. |
| 5,537,403 A | 7/1996 | Cloonan et al. |
| 5,541,917 A | 7/1996 | Farris |
| 5,544,161 A | 8/1996 | Bigham et al. |
| 5,544,163 A | 8/1996 | Madonna |
| 5,544,164 A | 8/1996 | Baran |
| 5,544,168 A | 8/1996 | Jeffrey et al. |
| 5,553,063 A | 9/1996 | Dickson |
| 5,557,658 A | 9/1996 | Gregorek et al. |
| 5,563,937 A | 10/1996 | Bruno et al. |
| 5,566,236 A | 10/1996 | MeLampy et al. |
| 5,568,475 A | 10/1996 | Doshi et al. |
| 5,570,355 A | 10/1996 | Dail et al. |
| 5,572,583 A | 11/1996 | Wheeler, Jr. et al. |
| 5,577,038 A | 11/1996 | Miyahara |
| 5,577,041 A | 11/1996 | Sharma et al. |
| 5,579,308 A | 11/1996 | Humpleman |
| 5,590,181 A | 12/1996 | Hogan et al. |
| 5,592,477 A | 1/1997 | Farris et al. |
| 5,592,538 A | 1/1997 | Kosowsky et al. |
| 5,594,732 A | 1/1997 | Bell et al. |
| 5,600,643 A | 2/1997 | Robrock, II |
| 5,600,649 A | 2/1997 | Sharma et al. |
| 5,602,991 A | 2/1997 | Berteau |
| 5,604,737 A | 2/1997 | Iwami et al. |
| 5,606,594 A | 2/1997 | Register et al. |
| 5,608,786 A | 3/1997 | Gordon |
| 5,613,069 A | 3/1997 | Walker |
| H1641 H | 4/1997 | Sharman |
| 5,621,727 A | 4/1997 | Vaudreuil |
| 5,625,677 A | 4/1997 | Feiertag et al. |
| 5,628,004 A | 5/1997 | Gormley et al. |
| 5,631,897 A | 5/1997 | Pacheco et al. |
| 5,640,446 A | 6/1997 | Everett et al. |
| 5,646,945 A | 7/1997 | Bergler |
| 5,650,999 A | 7/1997 | Dickson |
| 5,654,957 A | 8/1997 | Koyama |
| 5,659,541 A | 8/1997 | Chan |
| 5,659,542 A | 8/1997 | Bell et al. |
| 5,680,437 A | 10/1997 | Segal |
| 5,684,799 A | 11/1997 | Bigham et al. |
| 5,689,553 A | 11/1997 | Ahuja et al. |
| 5,692,126 A | 11/1997 | Templeton et al. |

| | | | | | | |
|---|---|---|---|---|---|---|
| 5,701,301 A | 12/1997 | Weisser, Jr. | 5,982,866 A | 11/1999 | Kowalski | |
| 5,706,286 A | 1/1998 | Reiman et al. | 5,991,291 A | 11/1999 | Asai et al. | |
| 5,710,769 A | 1/1998 | Anderson et al. | 5,991,394 A | 11/1999 | Dezonno et al. | |
| 5,712,903 A | 1/1998 | Bartholomew et al. | 5,999,525 A | 12/1999 | Krishnaswamy et al. | |
| 5,712,908 A | 1/1998 | Brinkman et al. | 6,005,870 A | 12/1999 | Leung et al. | |
| 5,724,412 A | 3/1998 | Srinivasan | 6,006,272 A | 12/1999 | Aravamudan et al. | |
| 5,727,057 A | 3/1998 | Emery et al. | 6,009,469 A | 12/1999 | Mattaway et al. | |
| 5,729,544 A | 3/1998 | Lev et al. | 6,012,088 A | 1/2000 | Li et al. | |
| 5,732,074 A | 3/1998 | Spaur et al. | 6,014,437 A | 1/2000 | Acker et al. | |
| 5,732,078 A | 3/1998 | Arango | 6,020,916 A | 2/2000 | Gerszberg et al. | |
| 5,732,216 A | 3/1998 | Logan et al. | 6,026,083 A | 2/2000 | Albrow et al. | |
| 5,737,320 A | 4/1998 | Madonna | 6,028,917 A | 2/2000 | Creamer et al. | |
| 5,737,331 A | 4/1998 | Hoppal et al. | 6,031,836 A | 2/2000 | Haserodt | |
| 5,737,333 A | 4/1998 | Civanlar et al. | 6,031,904 A | 2/2000 | An et al. | |
| 5,737,533 A | 4/1998 | De Hond | 6,041,325 A * | 3/2000 | Shah et al. | 707/10 |
| 5,740,164 A | 4/1998 | Liron | 6,044,403 A | 3/2000 | Gerszberg et al. | |
| 5,740,231 A | 4/1998 | Cohn et al. | 6,069,890 A | 5/2000 | White et al. | |
| 5,742,596 A | 4/1998 | Baratz et al. | 6,075,992 A | 6/2000 | Moon et al. | |
| 5,742,905 A | 4/1998 | Pepe et al. | 6,078,581 A | 6/2000 | Shtivelman et al. | |
| 5,751,706 A | 5/1998 | Land et al. | 6,084,584 A | 7/2000 | Nahi et al. | |
| 5,751,968 A | 5/1998 | Cohen | 6,094,478 A | 7/2000 | Shepherd et al. | |
| 5,754,641 A | 5/1998 | Voit et al. | 6,104,800 A | 8/2000 | Benson | |
| 5,764,628 A | 6/1998 | Davis et al. | 6,134,235 A | 10/2000 | Goldman et al. | |
| 5,764,736 A | 6/1998 | Shachar et al. | 6,141,341 A | 10/2000 | Jones et al. | |
| 5,764,750 A | 6/1998 | Chau et al. | 6,161,128 A | 12/2000 | Smyk | |
| 5,764,756 A | 6/1998 | Onweller | 6,161,134 A | 12/2000 | Wang et al. | |
| 5,777,991 A | 7/1998 | Adachi et al. | 6,163,598 A | 12/2000 | Moore | |
| 5,790,538 A | 8/1998 | Sugar | 6,167,040 A | 12/2000 | Haeggstrom | |
| 5,793,762 A | 8/1998 | Penners et al. | 6,175,860 B1 | 1/2001 | Gaucher | |
| 5,793,771 A | 8/1998 | Darland et al. | 6,188,688 B1 | 2/2001 | Buskirk, Jr. | |
| 5,799,072 A | 8/1998 | Vulcan et al. | 6,212,261 B1 | 4/2001 | Meubus et al. | |
| 5,799,154 A | 8/1998 | Kuriyan | 6,216,158 B1 | 4/2001 | Luo et al. | |
| 5,802,160 A * | 9/1998 | Kugell et al. ........... 379/211.04 | 6,240,097 B1 | 5/2001 | Wesloek et al. | |
| 5,805,587 A | 9/1998 | Norris et al. | 6,259,692 B1 | 7/2001 | Shtivelman et al. | |
| 5,805,588 A | 9/1998 | Petersen | 6,262,978 B1 | 7/2001 | Bruno et al. | |
| 5,806,057 A | 9/1998 | Gormley et al. | 6,266,539 B1 | 7/2001 | Pardo | |
| 5,809,022 A | 9/1998 | Byers et al. | 6,278,707 B1 | 8/2001 | MacMillan et al. | |
| 5,809,128 A | 9/1998 | McMullin | 6,301,609 B1 | 10/2001 | Aravamudan et al. | |
| 5,812,534 A | 9/1998 | Davis et al. | 6,308,201 B1 | 10/2001 | Pivowar et al. | |
| 5,815,505 A | 9/1998 | Mills | 6,324,183 B1 | 11/2001 | Miller et al. | |
| 5,818,912 A | 10/1998 | Hammond | 6,327,258 B1 | 12/2001 | Deschaine et al. | |
| 5,825,771 A | 10/1998 | Cohen et al. | 6,334,126 B1 | 12/2001 | Nagatomo et al. | |
| 5,828,666 A | 10/1998 | Focsaneanu et al. | 6,337,858 B1 | 1/2002 | Petty et al. | |
| 5,838,665 A | 11/1998 | Kahn et al. | 6,339,594 B1 | 1/2002 | Civanlar et al. | |
| 5,850,433 A | 12/1998 | Rondeau | 6,359,892 B1 | 3/2002 | Szlam | |
| 5,859,972 A | 1/1999 | Subramaniam et al. | 6,381,323 B1 * | 4/2002 | Schwab et al. | 379/211.02 |
| 5,867,494 A | 2/1999 | Krishnaswamy et al. | 6,385,308 B1 | 5/2002 | Cohen et al. | |
| 5,867,495 A | 2/1999 | Elliott et al. | 6,404,764 B1 | 6/2002 | Jones et al. | |
| 5,875,405 A | 2/1999 | Honda | 6,411,615 B1 | 6/2002 | DeGolia et al. | |
| 5,878,113 A | 3/1999 | Bhusri | 6,411,965 B2 | 6/2002 | Klug | |
| 5,878,418 A | 3/1999 | Polcyn et al. | 6,414,962 B1 | 7/2002 | Hall et al. | |
| 5,881,060 A | 3/1999 | Morrow et al. | 6,418,198 B2 | 7/2002 | Brablec et al. | |
| 5,881,131 A | 3/1999 | Farris et al. | 6,421,235 B2 | 7/2002 | Ditzik | |
| 5,889,774 A | 3/1999 | Mirashrafi et al. | 6,445,694 B1 | 9/2002 | Swartz | |
| 5,894,473 A | 4/1999 | Dent | 6,445,697 B1 | 9/2002 | Fenton | |
| 5,894,595 A | 4/1999 | Foladare et al. | 6,446,127 B1 | 9/2002 | Schuster et al. | |
| 5,913,029 A | 6/1999 | Shostak | 6,448,978 B1 | 9/2002 | Salvador et al. | |
| 5,915,008 A | 6/1999 | Dulman | 6,456,594 B1 | 9/2002 | Kaplan et al. | |
| 5,918,172 A | 6/1999 | Saunders et al. | 6,456,601 B1 | 9/2002 | Kozdon et al. | |
| 5,922,047 A | 7/1999 | Newlin et al. | 6,459,780 B1 | 10/2002 | Wurster et al. | |
| 5,930,700 A | 7/1999 | Pepper et al. | 6,477,565 B1 | 11/2002 | Daswani et al. | |
| 5,933,490 A | 8/1999 | White et al. | 6,477,576 B2 | 11/2002 | Angwin et al. | |
| 5,933,778 A | 8/1999 | Buhrmann et al. | 6,483,902 B1 | 11/2002 | Stewart et al. | |
| 5,938,757 A | 8/1999 | Bertsch | 6,493,338 B1 | 12/2002 | Preston et al. | |
| 5,946,386 A | 8/1999 | Rogers et al. | 6,496,477 B1 | 12/2002 | Perkins et al. | |
| 5,946,684 A | 8/1999 | Lund | 6,526,462 B1 | 2/2003 | Elabd | |
| 5,953,392 A | 9/1999 | Rhie et al. | 6,539,359 B1 | 3/2003 | Ladd et al. | |
| 5,954,799 A | 9/1999 | Goheen et al. | 6,577,622 B1 | 6/2003 | Shuster et al. | |
| 5,958,016 A | 9/1999 | Chang et al. | 6,584,490 B1 | 6/2003 | Shuster et al. | |
| 5,960,340 A | 9/1999 | Fuentes | 6,614,781 B1 | 9/2003 | Elliott et al. | |
| 5,963,551 A | 10/1999 | Minko | 6,650,901 B1 | 11/2003 | Shuster et al. | |
| 5,970,059 A | 10/1999 | Ahopelto et al. | 6,681,252 B1 | 1/2004 | Shuster et al. | |
| 5,974,449 A | 10/1999 | Chang et al. | 6,697,461 B1 | 2/2004 | Middleswarth et al. | |

| | | | |
|---|---|---|---|
| 6,731,630 B1 | 5/2004 | Shuster et al. | |
| 6,741,586 B1 | 5/2004 | Shuster et al. | |
| 6,744,759 B1 * | 6/2004 | Sidhu et al. | 370/356 |
| 6,785,266 B2 | 8/2004 | Swartz | |
| 6,788,775 B1 | 9/2004 | Simpson | |
| 6,795,429 B1 | 9/2004 | Shuster et al. | |
| 6,804,224 B1 | 10/2004 | Shuster et al. | |
| 6,822,957 B1 | 11/2004 | Shuster et al. | |
| 6,853,714 B2 | 2/2005 | Liljestrand et al. | |
| 6,856,616 B1 | 2/2005 | Shuster et al. | |
| 6,857,021 B1 | 2/2005 | Shuster et al. | |
| 6,857,072 B1 | 2/2005 | Shuster et al. | |
| 6,870,830 B1 | 3/2005 | Shuster et al. | |
| 6,914,897 B1 | 7/2005 | Shuster et al. | |
| 6,937,699 B1 | 8/2005 | Shuster et al. | |
| 6,956,941 B1 | 10/2005 | Duncan et al. | |
| 2001/0022784 A1 | 9/2001 | Menon et al. | |
| 2001/0030950 A1 | 10/2001 | Chen et al. | |
| 2003/0026403 A1 | 2/2003 | Clapper | |
| 2003/0040325 A1 | 2/2003 | Clark | |
| 2003/0095650 A1 | 5/2003 | Mize | |
| 2003/0133553 A1 | 7/2003 | Khakoo et al. | |
| 2003/0156693 A1 | 8/2003 | Goldman | |
| 2003/0194078 A1 | 10/2003 | Wood et al. | |
| 2004/0029568 A1 | 2/2004 | DeLuca et al. | |
| 2005/0041526 A1 | 2/2005 | Esmersoy et al. | |
| 2005/0141500 A1 | 6/2005 | Bhandari et al. | |
| 2005/0169445 A1 | 8/2005 | Harris | |
| 2005/0207557 A1 | 9/2005 | Dolan et al. | |

FOREIGN PATENT DOCUMENTS

| | | |
|---|---|---|
| EP | 0578374 | 1/1994 |
| EP | 0704788 | 4/1996 |
| EP | 0738093 | 10/1996 |
| EP | 0 789 470 | 8/1997 |
| EP | 0 794 650 | 9/1997 |
| EP | 0 797 373 | 9/1997 |
| EP | 0 824 298 | 2/1998 |
| EP | 0 829 995 | 3/1998 |
| EP | 0 841 831 | 5/1998 |
| EP | 0 847 176 | 6/1998 |
| EP | 0 851 653 | 7/1998 |
| EP | 0 853 411 A2 | 7/1998 |
| EP | 0858202 | 8/1998 |
| EP | 0 866 596 | 9/1998 |
| EP | 0 872 998 | 10/1998 |
| EP | 0869688 | 10/1998 |
| EP | 0918423 | 10/1998 |
| EP | 0881848 | 12/1998 |
| EP | 0898431 | 2/1999 |
| GB | 2 315 190 | 1/1998 |
| JP | 10-23067 | 1/1998 |
| JP | 10-51453 | 2/1998 |
| JP | 10-164135 | 6/1998 |
| JP | 10-164257 | 6/1998 |
| WO | WO94/05111 | 3/1994 |
| WO | WO95/34985 | 12/1995 |
| WO | WO 96/08935 | 3/1996 |
| WO | WO 96/15598 | 5/1996 |
| WO | WO 97/14234 A2 | 4/1997 |
| WO | WO 97/14238 | 4/1997 |
| WO | WO 97/16007 | 5/1997 |
| WO | WO 97/22216 | 6/1997 |
| WO | WO 97/23078 | 6/1997 |
| WO | WO 97/27692 | 7/1997 |
| WO | WO 97/28628 | 8/1997 |
| WO | WO 97/29581 | 8/1997 |
| WO | WO97/31492 | 8/1997 |
| WO | WO97/31492 | 8/1997 |
| WO | WO 97/33412 | 9/1997 |
| WO | WO97/33421 | 9/1997 |
| WO | WO 97/38511 A2 | 10/1997 |
| WO | WO 97/38551 | 10/1997 |
| WO | WO 97/39560 | 10/1997 |
| WO | WO97/44943 | 11/1997 |
| WO | WO 97/46073 A2 | 12/1997 |
| WO | WO 97/47118 | 12/1997 |
| WO | WO 97/50217 | 12/1997 |
| WO | WO 97/50271 | 12/1997 |
| WO | WO 97/50277 A2 | 12/1997 |
| WO | WO98/00988 | 1/1998 |
| WO | WO98/04065 | 1/1998 |
| WO | WO 98/04989 | 2/1998 |
| WO | WO98/10538 | 3/1998 |
| WO | WO 98/11704 | 3/1998 |
| WO | WO 98/12860 | 3/1998 |
| WO | WO 98/13974 | 4/1998 |
| WO | WO98/16051 | 4/1998 |
| WO | WO 98/18238 | 4/1998 |
| WO | WO 98/18289 | 4/1998 |
| WO | WO 98/19425 | 5/1998 |
| WO | WO 98/19445 | 5/1998 |
| WO | WO 98/20701 | 5/1998 |
| WO | WO98/21911 | 5/1998 |
| WO | WO 98/23067 | 5/1998 |
| WO | WO 98/23080 | 5/1998 |
| WO | WO 98/26543 | 6/1998 |
| WO | WO 98/28885 | 7/1998 |
| WO | WO 98/30007 | 7/1998 |
| WO | WO 98/30008 | 7/1998 |
| WO | WO98/30008 | 7/1998 |
| WO | WO 98/34391 | 8/1998 |
| WO | WO 98/34399 | 8/1998 |
| WO | WO 98/36543 | 8/1998 |
| WO | WO 98/37665 | 8/1998 |
| WO | WO98/37665 | 8/1998 |
| WO | WO 98/37688 A2 | 8/1998 |
| WO | WO 98/39897 | 9/1998 |
| WO | WO 98/42104 | 9/1998 |
| WO | WO 98/42107 | 9/1998 |
| WO | WO 98/42146 | 9/1998 |
| WO | WO 98/47256 A2 | 10/1998 |
| WO | WO 98/51063 | 11/1998 |
| WO | WO99/12365 | 3/1999 |
| WO | WO99/19988 | 4/1999 |
| WO | WO99/20059 | 4/1999 |
| WO | WO99/35802 | 7/1999 |
| WO | WO99/45687 | 9/1999 |
| WO | WO01/05078 | 1/2001 |
| WO | WO01/24496 | 4/2001 |
| WO | WO01/24498 | 4/2001 |
| WO | WO01/24500 | 4/2001 |
| WO | WO01/24501 | 4/2001 |
| WO | WO01/24502 | 4/2001 |
| WO | WO01/24503 | 4/2001 |
| WO | 0184859 A2 | 11/2001 |

OTHER PUBLICATIONS

Mary Carmichael, "Calls That Follow you Anywhere," Newsweek, Apr. 28, 2003, p. 43.
RFC 3298 Service in the PSTN, Aug. 2002.
Implementing Automatic Location Update for Follow-Me database using VoIP and Bluetooth Technologies, IEEE Transaction on computers, vol. 51, No. 10, Oct. 2002.
New services demand integration, Electronic Engineering Times, Aug. 28, 2000, Iss. 1128; p. 110.
Natural Microsystems, M2 Presswire. Coventry: Aug. 18, 2000.
This pipe dream will come true: Voice Over Internet Protocol (VoIP) technology will make the phone Box something that really talks, Businessline, Chennai: Apr. 17, 2002.

Using Optimization to Achieve Efficient Quality of Service in Voice over IP Networks, IEEE 2003.

Broadsoft literature Broadworks overview, Copyright date 2002.

BroadSoft introduces industry's first complete service delivery and creation product suite for enhanced telephony services Broadworks, ATM Newsletter: Boston: Mar. 2000, vol. 9, Iss. 3, p. 13.

BroadSoft unveils advanced architecture for the rapid and cost effective delivery of enhanced communications services, Website, Aug. 25, 1999, Press releases, 3 pages.

U.S. Appl. No. 09/406,322, Schuster et al., filed Sep. 27, 1999.

U.S. Appl. No. 09/515,798, Schuster et al., filed Feb. 29, 2000.

* cited by examiner

Subscriber Registration and Login

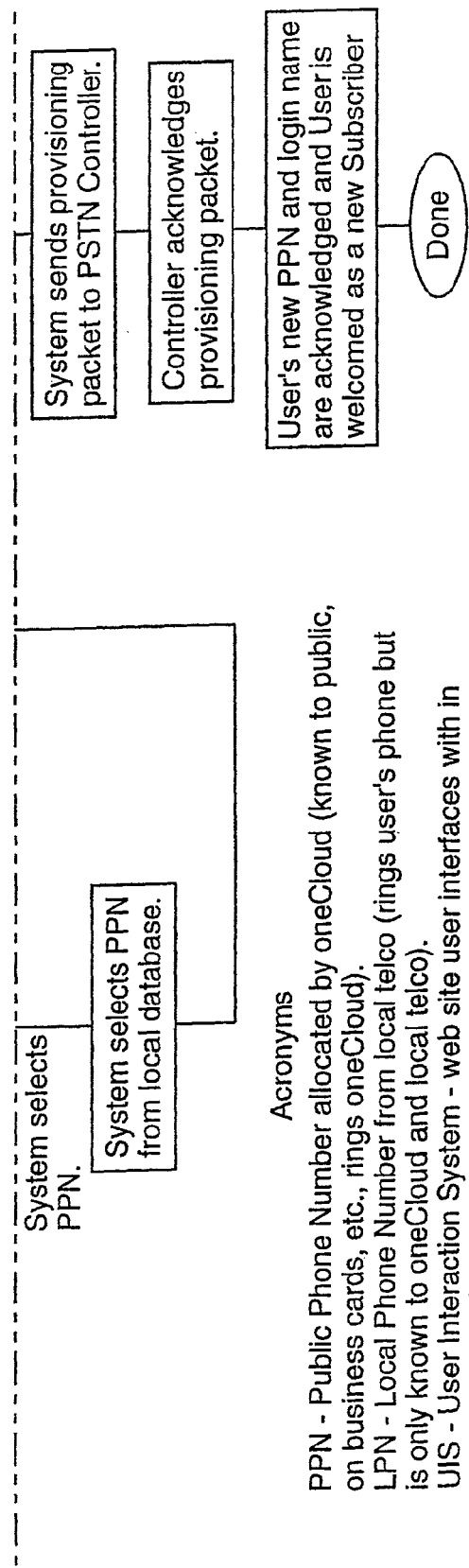

Acronyms
PPN - Public Phone Number allocated by oneCloud (known to public, on business cards, etc., rings oneCloud).
LPN - Local Phone Number from local telco (rings user's phone but is only known to oneCloud and local telco).
UIS - User Interaction System - web site user interfaces with in order to control phone features.
TAC - Tandem Acces Controller - System that directly accesses the PSTN.

FIG. 3B

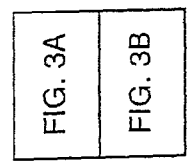

FIG. 3

BRANCH CALLING AND CALLER ID BASED CALL ROUTING TELEPHONE FEATURES

CROSS REFERENCE TO RELATED APPLICATIONS

This application is a division of U.S. application Ser. No. 10/426,279, filed Apr. 30, 2003, entitled "Branch Calling and Caller ID Based Call Routing Telephone Features," which is a continuation-in-part of U.S. application Ser. No. 09/565,565, filed May 4, 2000, entitled "Telephone Call Control System for the Public Switched Telephone Network," now U.S. Pat. No. 6,574,328, both incorporated herein by reference.

FIELD OF THE INVENTION

This invention relates to telephone services and, in particular, to a system for allowing a subscriber to select features of the subscriber's telephone service and to various novel features that can be selected.

BACKGROUND

People have used various means for limiting interruptions due to the telephone. In the past, people used switchboards and secretaries to screen incoming, or inbound, calls. Voice mail systems took over some of this role both in the home and in the central office. Today, there are web-based companies managing 3rd-party call control, via the toll-switch network, which allow users to enter call control information through a web portal. There are also edge devices in each of the public telephone company's central offices which provide local control, but offer an extremely limited number of features and do not provide true 3rd-party call control.

The web-based toll systems provide good user interaction but they are not economical and cannot take advantage of local number portability because they do not provide local control and connectivity.

The Public Switched Telephone Network (PSTN) consists of a plurality of edge switches connected to telephones on one side and to a network of tandem switches on the other. The tandem switch network allows connectivity between all of the edge switches, and a signalling system is used by the PSTN to allow calling and to transmit both calling and called party identity.

Until now, optional features were provided by the local service telephone company (telco) through the edge switch at the central office (CO). It was not possible to provide optional features through any other means. Control of these features was done through the first party (calling party) or the second party (called party), or worse yet, manually by calling the business office.

In the past, numerous devices have been built that allow the connection of two lines together at an edge switch. These devices can be used to add features to a telephone network by receiving a call on one line and then dialing out on another line. The problem with these devices is that, because they are connected through an edge switch, transmission losses and impairments occur, degrading the overall connection. In addition, signalling limitations prevent full control, by the subscriber or the system, over the call.

A preferred embodiment of the inventive system described herein connects at the tandem, thereby eliminating these problems.

In the edge devices residing in the PSTN central offices, the 1st party (the calling party) has numerous features available (dialing options). The 2nd party (called party) also has options available such as call forwarding, but these features typically require access from the first or second party's device and are extremely awkward to program. The user interaction is not only awkward, it is limited and requires interaction with the telephone company to provision them. In other words, past systems for provisioning, meaning addition, modification, or control of telephone features, required a subscriber to make the feature selection through the telephone business office. Central office workers would then implement the provisioning under request of the business office.

Call Forwarding is one popular provision. There is signification transmission degradation for Call Forwarding to take place. The calling party pays for a call to the edge device, and the edge subscriber, the called party, pays for the call to the forwarding number. For enhanced inbound call control to occur, a direct 3rd-party call control means is needed.

A variety of services have arisen to address the problems mentioned above. Many of these systems allow the called party to make changes to his/her call forwarding attributes which do not allow direct 3rd-party call control. These services provide good user interaction, some via the internet, but they rely upon the toll network through the use of "800" numbers. This requires the subscriber to pay by the minute and does not allow the subscriber to take advantage of number portability in order to obtain 3rd-party call control. There are other toll network mechanisms for remote call forwarding. For example, MCI offers a service where the customer can remotely change the forwarding target number for "800" numbers. Contacting the ultimate end-user before terminating the first incoming call is similar to the manner in which "800" credit calls and collect calls are processed, but these are not done at the local subscriber level.

In addition to these toll services, there are edge devices that perform some of the same services. Edge devices such as phones and PBXs that include voice mail, inter-active voice response, call forwarding, speed calling, etc., have been used to provide additional call control. These devices allow the phone user direct control over incoming and outgoing calls. The disadvantage of edge devices is that they add cost, degrade voice and transmission quality, can be difficult to program, are not easily programmed remotely, can require the user to pay for two lines, provide lower quality of service, and cannot provide the same level of functionality as a system that controls the PSTN directly. There are Voice Over Internet Protocol (VoiP) products emerging that provide better user interfaces and control but they do not take advantage and voice quality of the PSTN.

SUMMARY

A system for allowing a subscriber to remotely control features is described herein along with various telephone features that may be programmed into the system. A subscriber may be any customer using the telephone service, in contrast to employees of the PSTN who may use special communication networks within the PSTN. Two such features are caller ID (CID) based call routing and branch calling. The system allows the subscriber to set up a feature where the CID signal is detected within the PSTN and automatically associated with stored information relating to the caller. The stored information may have been previously entered into a memory within the PSTN by the subscriber via the world wide web. The CID signal may be also used to route the call to one of more forwarding numbers or to take any other action, such as blocking the call. This feature also allows the subscriber to use the CID signal to display certain information even though the caller may have her CID blocked.

Another feature described herein is referred to as branch calling, which allows a call to be forwarded to multiple telephones simultaneously, where the first telephone answered terminates the calling of the other telephones (or any other end units).

The preferred system described herein adds direct control of third party call control features, but does not suffer from any of the disadvantages listed above, and allows the subscriber to manage his/her telephone system in a dynamic and exceptionally useful manner that is not currently available through the existing PSTN. The system allows enhanced direct third-party call control features, such as selective call routing and remote dialing, to be added to the PSTN (Public Switched Telephone Network) using local call control and providing dynamic provisioning of the system by the subscriber. Direct 3rd-party control means that the ability to provision the 3rd-party features is directly available to a subscriber, eliminating the need to go through the telephone company (telco) business office.

In one embodiment, the system includes a processor (referred to herein as a tandem access controller) connected to the PSTN which would allow anyone to directly provision, that is to say set-up and make immediate changes to, the configuration of his or her phone line. In another embodiment, a tandem access controller (TAC) subsystem is connected internally to the PSTN in a local service area. The TAC provides features, selected by the subscriber, to all edge switches connected to the PSTN tandem switch. Connecting directly to the PSTN tandem switch (or embedding the system into the tandem switch) eliminates the signal degradation problems previously described.

In one embodiment, the system allows provisioning of features via the internet under direct control of the subscriber. Recently, several products have been introduced that provide a means of controlling features via the public internet. However, all these devices fall short in that they require the subscriber to obtain an "800" number or some other number that requires the subscriber to pay a toll charge each time a call is made. The system connects locally, so no toll charges are incurred.

The offered features are implemented by software programs run by the processing system.

The web-enhanced services in one embodiment of the invention coexist with and overlay the local phone service at the local level, thereby providing good economics and user interaction, single number access to multiple subscriber devices, connectivity without transmission impairments and true, direct 3rd-party call control.

The present system relies upon use of local telephone facilities thereby eliminating all the extra charges associated with making toll calls. It also allows the user to take advantage of number portability and keep his/her existing public phone number.

DETAILED DESCRIPTION OF THE EMBODIMENTS

Figure 1:
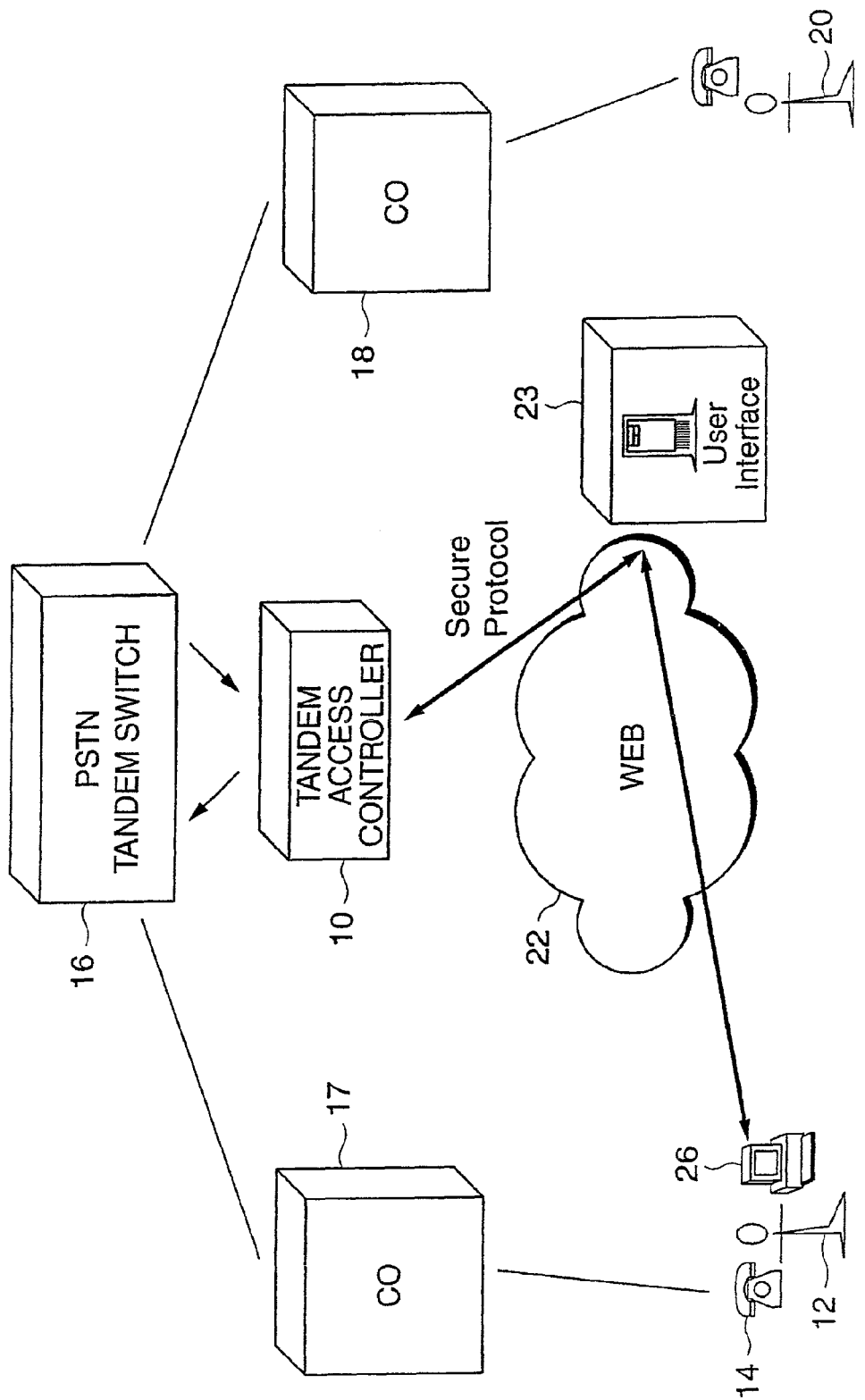
FIG. 1 illustrates the tandem access controller (TAC) in one embodiment of the present invention connected to the existing PSTN tandem switch, the TAC providing features for the subscriber's telephone as requested by the subscriber via the web.

FIG. 1 shows a tandem access controller (TAC) 10 that allows an authorized subscriber 12 to establish 3rd-party control criteria for calls to the subscriber's telephone 14 (having a "public" phone number that callers dial). In one embodiment, the TAC 10 is a programmed processor. The TAC 10 may use any combination of hardware, firmware, or software and, in one embodiment, is a conventional computer programmed to carry out the functions described herein.

The TAC 10 is connected to or inside the conventional PSTN tandem switch 16 such that calls may flow through the TAC 10 in the same manner as the existing PSTN tandem switch, except that additional 3rd-party features are applied to the call. As is well known, PSTN tandem switches are exchanges that direct telephone calls (or other traffic) to central offices 17,18 or to other tandem switches. Details of the operation of the existing phone network may be found in the publication entitled "New Net SS7 Tutorial," by ADC Telecommunications, copyright 1999, incorporated herein by reference. Additional details may be found in the numerous books describing the PSTN.

The PSTN tandem switch 16 directs a first call (from the calling party 20 to the subscriber's phone 14 using the subscriber's public phone number) to the TAC 10, which in turn places a second call, subject to 3rd-party control information, to the subscriber's "private" phone number without yet terminating the first call. The TAC 10 is connected within the subscriber's local service area so calls from TAC 10 to the subscriber do not incur a toll. When the subscriber 12 terminates (or answers) the second call, the TAC 10 terminates the first call and connects it to the second call, thereby connecting the calling party 20 to the subscriber 12. Hence, the calling party essentially calls the TAC 10, using the subscriber's public phone number, and the TAC 10, after processing the call using the selected features, calls the subscriber, as appropriate, using the subscriber's private phone number and connects the two calls. The process is transparent to the parties.

The TAC 10 is connected inside the PSTN in the sense that it is not an edge device such as a PBX or central office (CO) switch because it does not connect directly to subscribers. Rather, it redirects calls to subscribers. The TAC 10 provides intelligent interconnection between a calling party and a subscriber.

Figure 2:
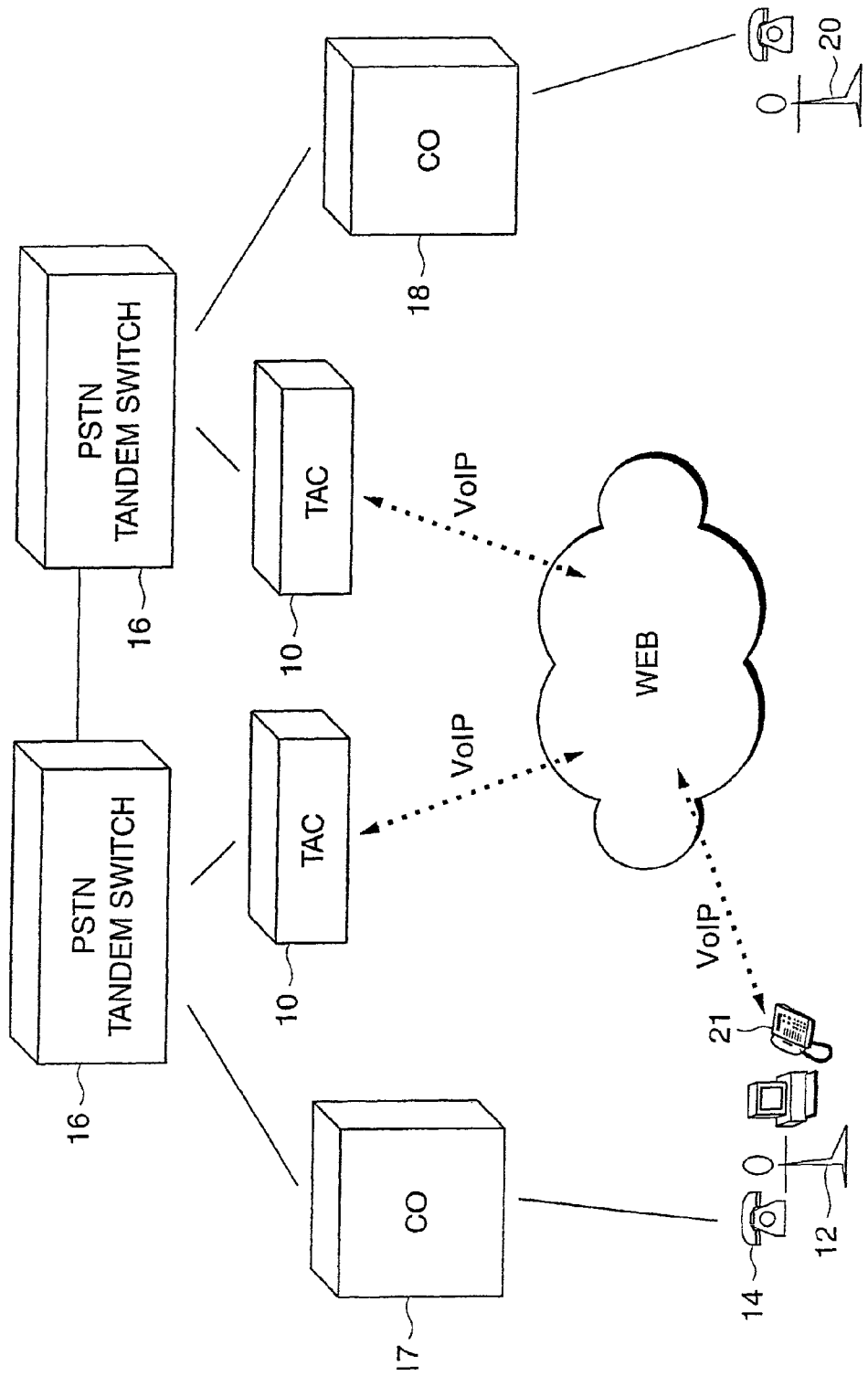
FIG. 2 illustrates a system similar to FIG. 1 but showing multiple tandem switches and TACs and also showing how the subscriber may, in additional to using the standard telephone, make phone calls using Voice Over IP via a conventional digital telephone.

The reader should keep in mind that although only one tandem switch 16 is shown in FIG. 1, the invention will apply equally well to a network of tandem switches, as shown in FIG. 2. FIG. 2 also illustrates how the subscriber can make calls using voice over IP via a conventional digital telephone 21.

FIG. 1 illustrates the preferred method for an authorized subscriber to modify the 3rd-party control criteria by means of the world wide web 22 (and web server 23) using an internet browser. By "authorized" we mean a subscriber who is registered and has logged-in with appropriate security and password controls. The subscriber 12 interacts with the web 22 via the Internet to quickly and easily specify the enhanced 3rd-party call control features. Web 22 then relays this information, in appropriate form, to the TAC 10. Preferably, the link to the TAC 10 uses a secure protocol. Examples of features that can be selected by the subscriber include: conditional call blocking, call forwarding, call altering, time of day conditions, day of week conditions, follow-me, caller recognition/password, caller ID, call screening/retrieval from voice mail, speed dialing, interactive voice response, and speech recognition. Any other feature could be added. These features can be implemented in the TAC 10 using known software techniques since such features are known. Message outgoing call control includes: click-to-dial calling and group calling/messaging.

The invention may also include ivr/vm/voverip.

Figure 3A:
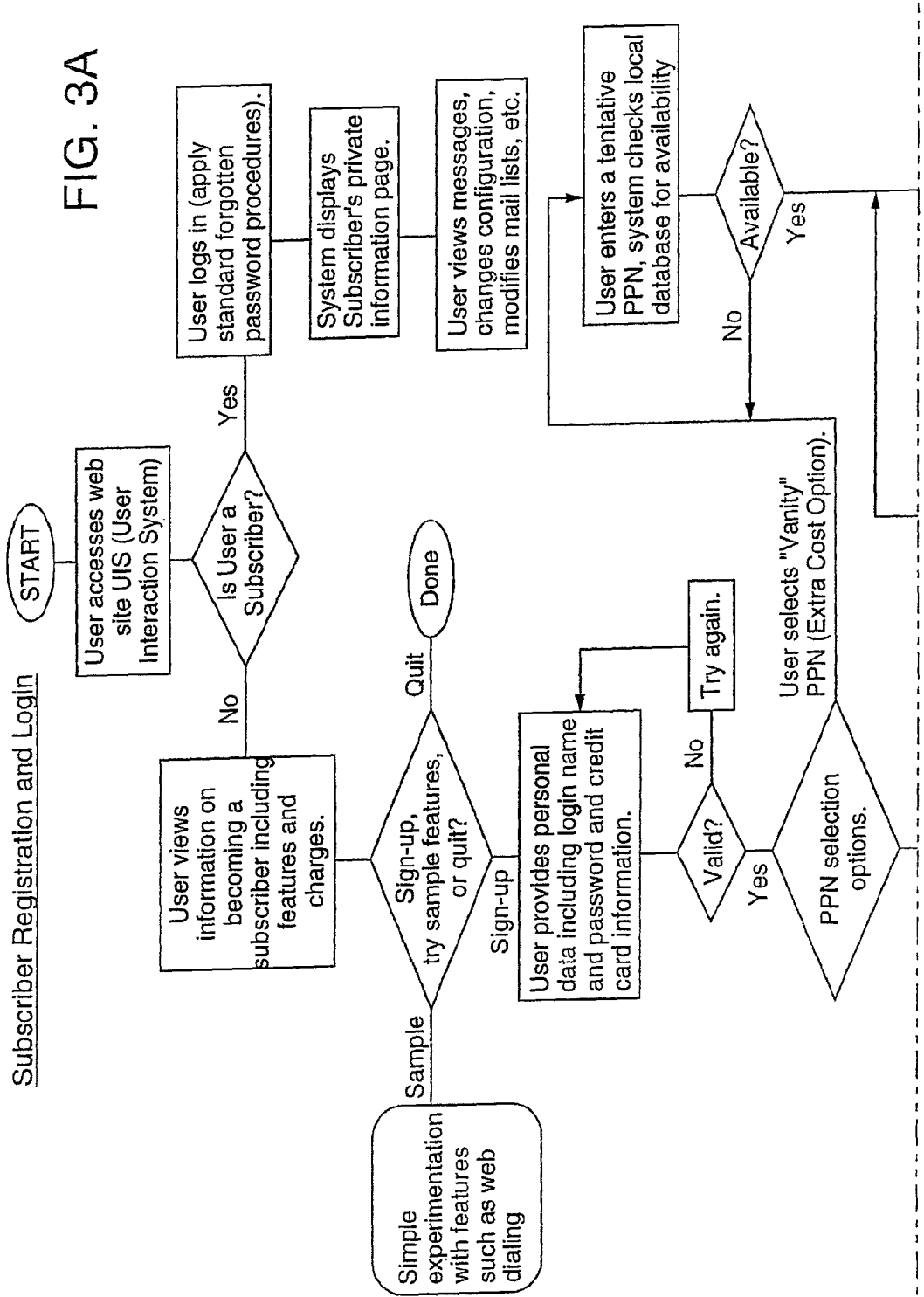
FIG. 3 is a flowchart of one method that a person may use to set up a subscriber account and to designate features the subscriber would like for his/her telephone.

FIG. 1 uses a public internet portal connected via a data link to the TAC 10 or other interface system. As a registered subscriber, a user logs onto the portal (FIG. 3) and is granted access, allowing the user to make additions or changes to features such as speed calling, call forwarding, selection of such descriptors as time of day, busy status, caller ID status, etc. A user-friendly web page leads the subscriber through the various procedures and available features. The selections made by the subscriber are translated into provisioning data and transmitted to the TAC 10. The TAC 10 in turn keeps track of incoming and outgoing calls based on this information.

The subscriber can also program a set of the call control features via a telephone link in the event a data link connection is unavailable.

Figure 4:
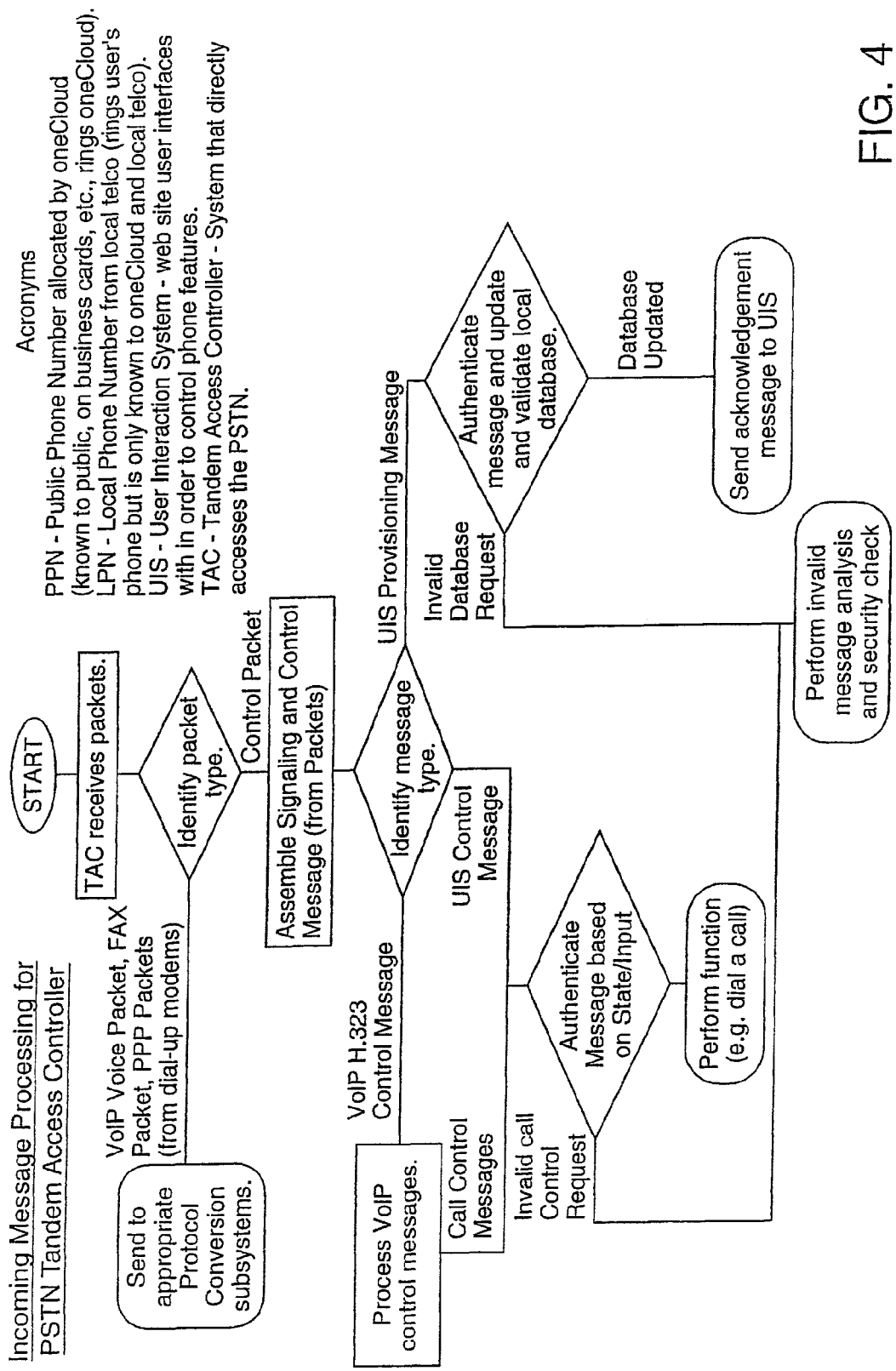
FIG. 4 is a flowchart of a method that can be performed by the TAC in response to the subscriber (or other service) controlling the TAC, using the web (or other packet-based system), to change the subscriber's telephone provisioning or perform another function, such as make a VoIP call.

FIG. 4 is a flowchart of actions that may be taken by the TAC 10 in response to the subscriber (or other service) controlling the TAC, using the web or other packet-based system, to change the subscriber's telephone provisioning or perform another function, such as make a VoIP call.

Figure 5:
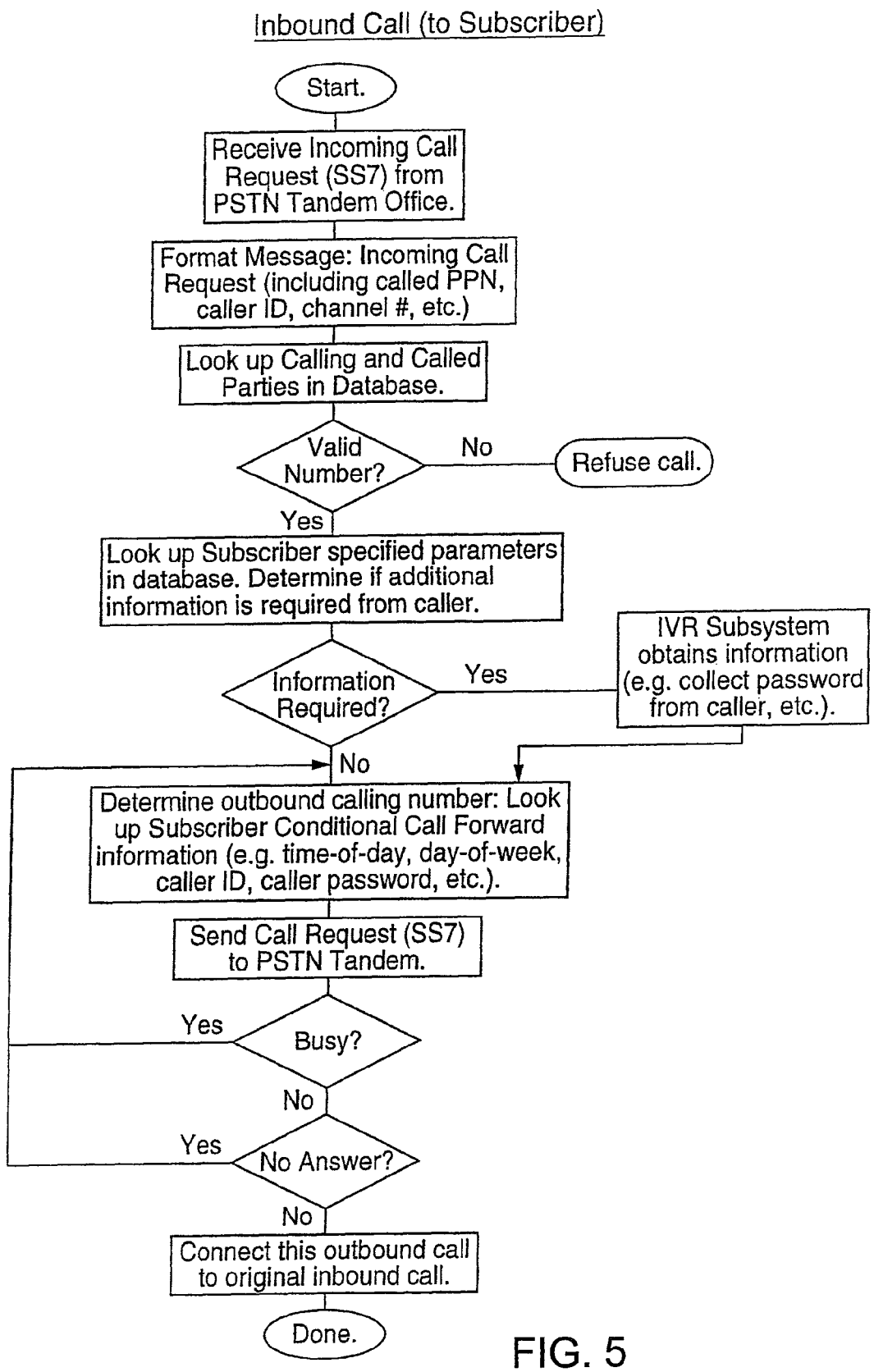
FIG. 5 is a flowchart of a method that can be performed by the TAC in response to an inbound call to the subscriber.

FIG. 5 is a flowchart of actions taken by the TAC 10 in response to an inbound call (using the subscriber's public phone number) to the subscriber. Examples of some of the actions taken by the TAC 10 are:

Receives SS7 data indicating an incoming call
Stores phone numbers downloaded from provisioning system
Charts identity of calling party
Checks time of day
Stores lists of numbers in groups used for processing incoming calls
Places outgoing calls in response to incoming calls according to information downloaded on the data link.

Incoming call data is received by the TAC 10 from the tandem switch 16. The TAC 10 processor checks calling and called numbers, class of service, time of day, number lists, etc. In some cases additional data is gathered from the calling party via a DSP (Digital Signal Processing) system and stored in the system memory. The DSP system is used to play call progress tones and voice announcements as required. Voice announcements can be played through the DSP system. In response to the call data, an outgoing call to the subscriber 12 may be placed back through the tandem switch 16 by TAC 10. The TAC 10 links the two calls and monitors the connection.

Information about the call may be collected by the TAC 10 and sent to the subscriber or a 3rd party for display. Such information may be the length of the call or information used to bill the subscriber for the use of the system. The provisioning system can also collect control information from a 3rd party and relay it back to the TAC 10, which will then affect the call accordingly.

Figure 6:
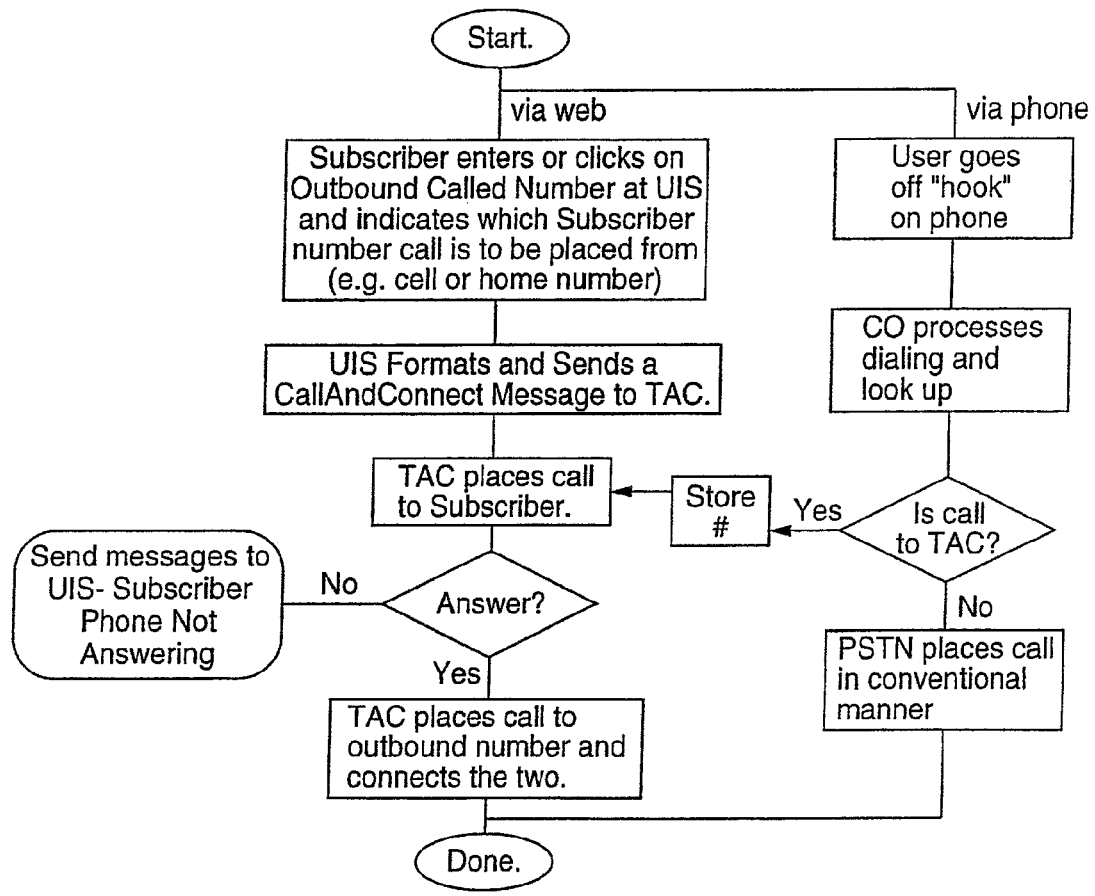
FIG. 6 is a flowchart of a method performed by the subscriber and the TAC when the subscriber desires to make an outbound call via the web or using a conventional telephone.

FIG. 6 is a flowchart of actions taken by the subscriber 12 and the TAC 10 when the subscriber desires to make an outbound call via the web or using a conventional telephone. When using the web to place a call, the subscriber may simply click a name on the computer screen 26 using a mouse.

Figure 7:
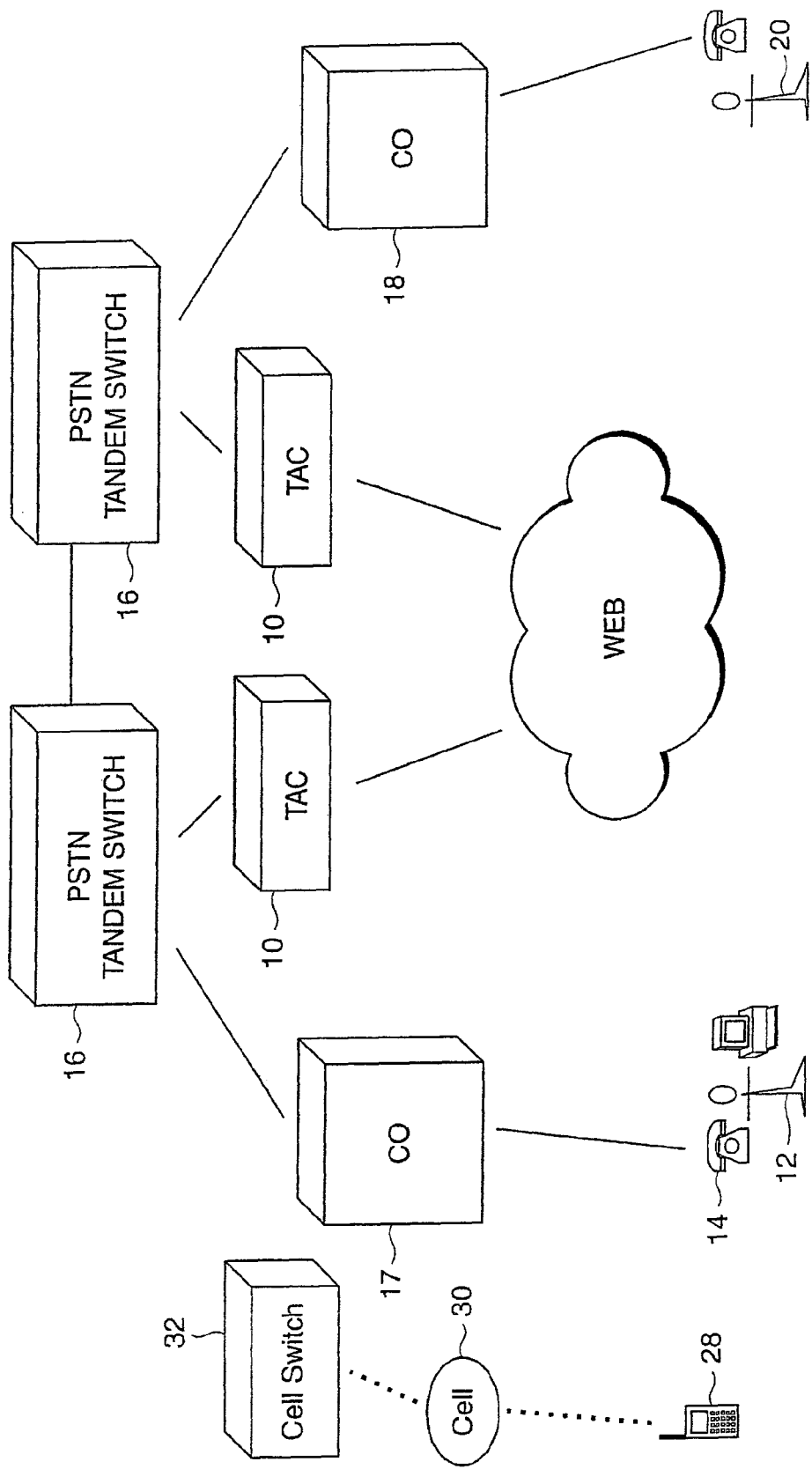
FIG. 7 illustrates a system, using the TAC, that allows wireless cell phones to obtain the same provisioning options as the conventional telephones.

FIG. 7 illustrates a system, using the TAC 10, that allows wireless cell phones 28 to obtain the same provisioning options as the conventional telephones 14. A local cell 30 and a cell switch 32 are also shown in FIG. 7.

Figure 8:
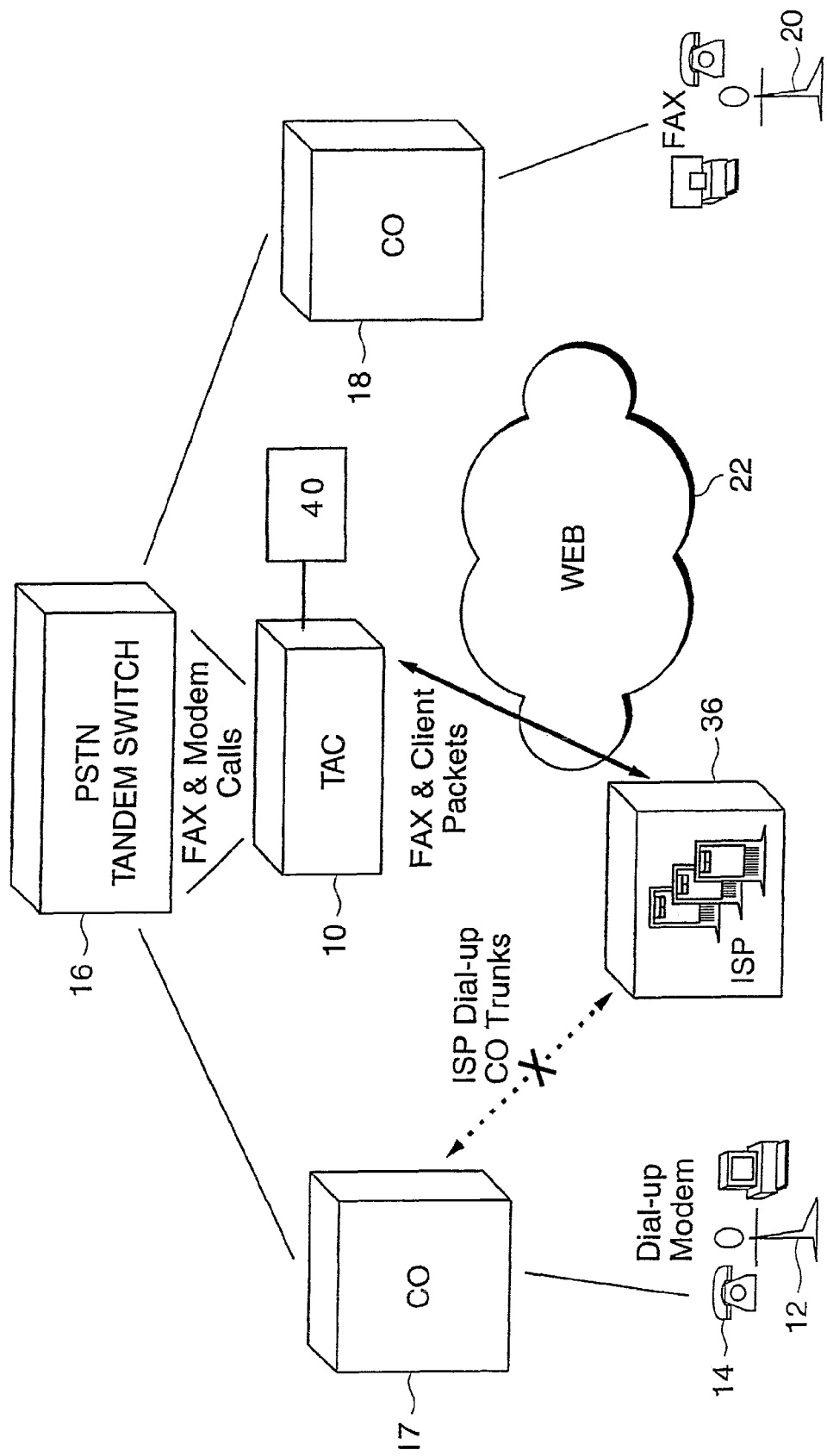
FIG. 8 illustrates a system, using the TAC, that allows fax and modem calls to benefit from the provisioning offered by the TAC.

FIG. 8 illustrates a system, using the TAC 10, that allows fax and modem calls to benefit from the provisioning offered by the TAC 10. The TAC 10 may interface the ISP 36 through the web 22.

One embodiment of the invention allows a subscriber to view the current state of his/her telephone via the Internet. Internet is a term of art by which we mean an interconnection of packet switched networks. Prior to this system there was no way for a user to examine the status of a telephone line. Recently, several products have been introduced that provide a means of examining the voice message boxes.

An internet portal is connected via a data link to the TAC 10. When a user logs onto the internet portal and is granted access to an individual subscription, the user can examine the status of calls/features. This information is transmitted from the TAC 10 to the web portal and translated into user viewables. The TAC 10 keeps track of incoming and outgoing calls based on this information.

The TAC 10 may be implemented using conventional processor hardware. The connection to the tandem switch 16 may be as simple as a telephone circuit, since the TAC 10 receives an incoming call from a caller and processes the call. Devising the software/firmware use to control the TAC 10 is well within the capability of those skilled in the art since the various control features that can be made available are generally already known.

Certain advantages that can be obtained using the invention include the following:

Web-Based Telecom Navigator
Manage Incoming Call Control
Conditional Call Blocking/Forwarding/Alerting
Time-of-Day, Day-of-Week, Follow-Me, Caller Recognition/Password, Caller ID, etc.
Call Screening/Retrieval from Voice Mail
Interactive Voice Response and Speech Recognition
Manage Outgoing Call Control
Click-to-Dial Calling
Group Calling and Messaging
Web-Based Billing
Web-Driven Personal Communications Management
Cost-Effective Single Phone Number Access
On-Line "Personal Digital Assistant"

On-Line "Telcom Navigator"
Inspired User Interaction
Secure and Reliable Technology
Cost-Effective Single Phone Number Access
CLEC Status
Free Local Calls, Incoming Calls (not 800 Toll Service)
Retain Current Number (Local Number Portability)
Low-Cost Calling Throughout LATA
Flat-Rate Foreign Exchange
Single Installation Covers Entire LATA
VoIP Toll-Bypass
Compatible With Existing Devices, Standards
Standard DTMF and VoIP Phones
Wireless Phones
Standard Wired/Wireless and PIM Browsers
Web-Based Personal Digital Assistant
Centralized and Consistent Personal Data
Build Once, Use Anywhere
Private/Public Phone Directories and Calendars
"Post-It" Style Annotation of Numbers
Web Dialing
Click-to-Dial from Web Pages, Directories, Calendars
Multiple Phone List Management
Unified Messaging
Voice Mail Access, Prompts, Alert Via Web
User Interaction
Expected Behavior
Compatible with Familiar Products (e.g. Palm Pilot)
Commonality Between All Wired and Wireless
Mode-Based Definition and Selection
Vacation, Dinner Time, Go Away, Family Call Waiting
Templates
Learning Modes
Persona-Based User Interaction Design
Speech recognition
Windows drag and drop
Automatic Data Capture
Build Phone List Based on Collected Usage Information
Drag and Drop Into Lists
Secure and Reliable Technology
Separate Web-Site and Link Gateway
No Direct External Access to Gateway
Additional Security Layer
No Denial-of-Service to Voice Links
VoIP Link Degradation Detection
Automatic Cutover to PSTN
E-Commerce Security
Billing Encryption Caller ID Based Call Routing One advantage of using TAC 10 is its ability to enhance caller ID information. Caller ID is a common feature where a calling party's telephone number is transmitted to the called party's telephone so it can be displayed on a small display screen in the telephone. This caller ID information is provided by the calling party's central office switch. Signaling System No. 7 (SS7) is a global standard for telecommunications and defines the procedures and protocol by which network elements in the PSTN exchange information (including the caller ID) over the telephone network for call set up, routing, and control. In some telephone sets, including wireless telephones, the name of the caller associated with the telephone number is also displayed on the called party's display screen.

TAC 10 can use this automatically generated caller ID signal to provide an enhanced set of caller ID related features. One such feature is the association of the standard caller ID information with additional information about the caller stored in a memory addressed by TAC 10. The enhanced caller ID information provided through TAC 10 provides a valuable tool to the subscriber in handling incoming calls. The basic caller ID information, such as the caller's telephone number and name, can still be sent to the subscriber's phone and displayed in a conventional manner while the enhanced caller ID information may be displayed on the phone display or on the subscriber's computer monitor via the web.

The caller ID signals, pursuant to the SS7 protocol, are detected by TAC 10 when a calling party calls the subscriber using the subscriber's public telephone number, as previously described. TAC 10 then uses the basic caller ID data to address a look-up table (LUT) containing any additional information that the subscriber has entered into the LUT's memory locations for association with that caller ID data. FIG. 8 shows such a LUT 40 within or connected to TAC 10.

In one example, the subscriber may identify a prospective calling party's telephone number to TAC 10 via the Internet and then associate the number with any other information for storing in LUT 40. Such other information may be all the possible callers using the calling telephone, personal information regarding the calling party, billing information, business information, account numbers, past discussions with the caller, or any other information. When TAC 10 detects the caller ID signals, TAC 10 addresses LUT 40 and downloads the retrieved information to the subscriber's telephone display or to the subscriber's computer via the web. Since TAC 10 (including LUT 40) stores this additional information, the subscriber is not required to personally provide processing or memory devices for this feature.

Multiple subscribers use the same TAC 10 and LUT 40 but only the memory locations in LUT 40 authorized for access by a particular subscriber are available to that subscriber.

A subscriber may program TAC 10 using the various means described previously to perform any number of features on an incoming telephone call based upon the caller ID data. Such features include forwarding a call associated with that particular caller ID data to one or more other telephones, or blocking calls associated with that particular caller ID data. Such calls may be forwarded or blocked only at certain times or on certain days as requested by the subscriber. All of the other features previously described may also be applied based upon the caller ID.

When the calling party elects to block her caller ID information, displaying the caller's number and name on the subscriber's telephone may violate the privacy act, so such a restriction should be programmed into the system. However, TAC 10 may still use the caller ID information for various legal purposes. For example, the subscriber may not wish to receive phone calls from a particular phone number or calling party. The subscriber may transmit to TAC 10 the caller ID information (e.g., the telephone number and/or the name) and instruct TAC 10 to either forward the call, block the call, or transmit any additional information from LUT 40 to the subscriber's phone display or computer monitor for screening the caller.

If caller ID information does not exist, such as where the local telephone company does not offer caller ID, TAC 10, when receiving the incoming call, can transmit an automatic message to the caller to enter identification information. TAC 10 then uses that information to address LUT 40 to identify any associated information in LUT 40 for transmission to the subscriber. TAC 10, in a recorded or simulated voice, can request the caller to enter her phone number via the telephone keypad. Alternatively, TAC can request that the caller speak her name or number, which would then be played to the subscriber or converted to text or a code by TAC 10 to address LUT 40. Alternatively, the caller can enter a personal identification number or any other type of code (e.g., the caller's name) via the keypad, which would identify the caller to TAC 10. Once obtained, the caller ID information entered can be used to route the incoming call via TAC 10 in any way programmed by the subscriber. Call routing can be based on time of day, the caller ID, any web input instructions, a direction by the calling party itself, or any other variable.

This technique is contrasted with 800-type services, which are reverse long distance services requiring the owner of the 800 number to pay for the incoming call. With 800 numbers, the caller ID must be unblocked to identify the amount of the toll. With the inventive technique, even blocked caller ID calls can result in information about the caller being transmitted to the subscriber or used by TAC 10 to selectively perform a function.

Figure 9:
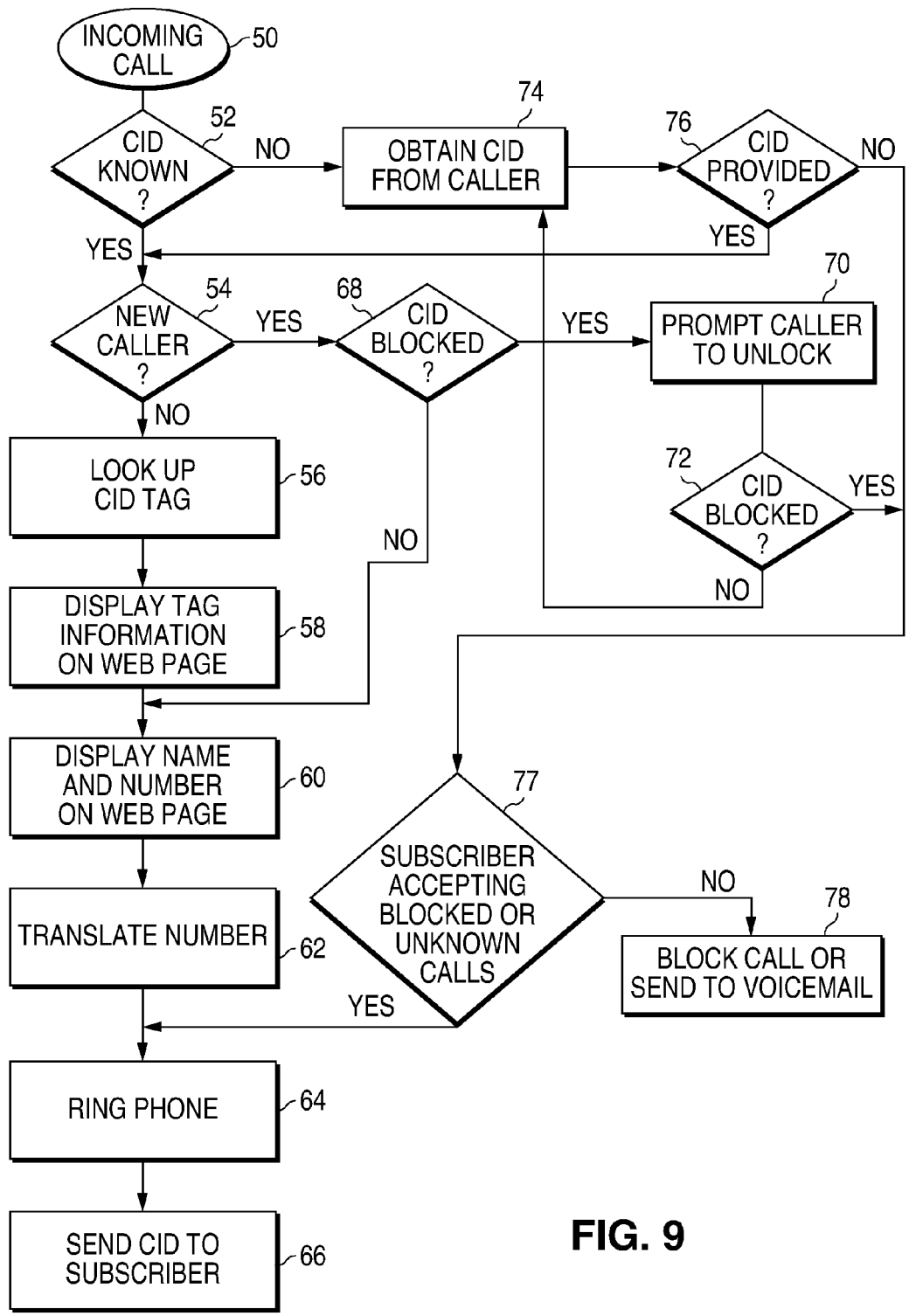
FIG. 9 is a flowchart of possible scenarios using the caller ID based feature.

FIG. 9 is a flowchart of various scenarios that may be carried out using the caller ID feature.

In step 50 of FIG. 9, an incoming call is received by TAC 10, as previously described, by a calling party calling the subscriber's public telephone number. In all embodiments described herein, the end unit called may be a residential telephone or other communication device connected to the PSTN via a central office, such as a computer, fax machine, or other communication device. The services provided by TAC 10 may be for residential telephone service or for business telephone service.

In step 52, using the SS7 protocol, TAC 10 detects the caller ID signal (CID), if any. Even if the calling party has a blocked CID, the CID is still transmitted to TAC 10; however the blocked caller ID cannot be displayed on the called party's telephone. If the CID is detected, the process continues to steps 54 and 56, which determine whether the CID is associated with any data in a look-up table. Existing data in the look-up table associated with the CID indicates that the caller is a previous caller. If caller ID information is known without ever previously receiving a call from that party, the additional information can still be entered into the look-up table, and the calling party will be treated as not a new caller in step 54.

Assuming the caller has information stored in the look-up table, this additional information is retrieved by TAC 10 and displayed on a web page (step 58) that is accessible by the subscriber via the web. In addition, the caller's name and telephone number may also by displayed (step 60). The information may also be transmitted to the subscriber's telephone for display.

In step 62, TAC 10 performs any programmed function on the call, such as forwarding the call to the subscriber's private telephone number or another number.

The placing of the second call by TAC 10 causes the called phone to ring (step 64) as well as causes the CID and additional information to be available to the subscriber (step 66) on the subscriber's telephone display. When the subscriber answers the phone, TAC 10 completes the connection between the two parties.

The retrieved information from LUT 40 that is transmitted over the web may appear as a screen pop-up on the subscriber's monitor. This CID information can then be reviewed and edited to include new information about the caller provided during the call. The subscriber then downloads this edited information to TAC 10 so future calls from the same caller would display the new information.

In step 54 if it is determined that the CID information is not associated with any existing information in the look-up table, TAC 10 determines whether the CID is blocked (identified in the SS7 protocol) in step 68. If the CID is not blocked, then the CID information is transmitted to the subscriber's telephone when TAC 10 places the call to the subscriber's private number (or any other forwarding number), and the CID is displayed on the subscriber's phone.

In step 68, if it is determined that the CID is blocked, TAC 10 will prompt the caller, via a recorded message or a simulated voice, to press the appropriate touch tone buttons to unblock the CID (step 70). For example, TAC 10 may be programmed to detect that a "1" key is pressed by the caller to unblock CID and then treat the CID information as unblocked. Alternatively, the caller may be required to call back after pressing the proper touch tone keys to unblock the CID in a conventional way.

In step 72, if the CID is now unblocked, the CID is obtained from the caller in step 74. The process also goes to step 74 if, in step 52, the CID is not initially obtained.

In step 76, TAC 10 determines whether the CID signal has been provided by the calling party from either the automatic CID signals or from the caller manually entering the caller's telephone number, name, or PIN, as previously described. If yes, then in step 54 TAC 10 uses the CID information to determine whether the caller is a new caller, and the remainder of the process continues as previously described.

In step 72, if it is determined that the CID remains blocked after TAC 10 has prompted the caller to unblock the CID, then in step 74 it is determined by TAC 10 is step 77 (after reviewing the subscriber's programmed instructions) whether the subscriber is accepting blocked calls. If yes, TAC 10 then places a call to the subscriber's private number or any other number identified by the subscriber, and puts the blocked call through. The blocked CID information would not be transmitted to the subscriber's phone.

If the subscriber's instructions are to not accept blocked calls, then in step 78 the blocked call is not forwarded to the subscriber's phone, or the blocked call is sent to voice mail. Voice mail may be a memory internal to TAC 10, or TAC 10 may transmit a special code to the subscriber's phone that automatically causes the call to be routed to a private voice mail system.

As seen, as long as the caller ID data received by TAC 10 has information associated with it in the look-up table, the stored information can be transmitted to the subscriber even if the caller ID is blocked. Further, even blocked caller IDs can still be used by TAC 10 to perform a routing function on the call. The caller ID feature may be implemented by a software program run by the processing system in TAC 10.

Because the conventional blocked CID information provided by the phone company is never displayed to the subscriber, the tagging system does not violate the privacy act. Known features such as call trace (where CID is provided to law enforcement people), or call return (where the blocked caller can be called back) have established a legal precedent that it is ok to use blocked CID information for certain purposes as long as the caller ID is not disclosed to the called party Branch Calling Branch calling is an enhanced telephone feature not believed to be provided on today's public telephone networks. This feature can be easily provided using TAC 10.

Branch calling is a technique where a caller places a first call intended for a called party to TAC 10. After receiving the call, TAC 10 looks up the call handling instructions programmed into TAC 10 by the subscriber via the web, via the telephone, or via any other technique. One set of these instructions is branch calling, which instructs TAC 10 to simultaneously call any number of different telephone numbers programmed into TAC 10 by the subscriber. The called phone numbers may be any combination of local, long distance, or cellular numbers.

When a party answers one of the ringing lines, the answering party is connected to the calling party, and the other calls are abandoned.

For branch calling to operate in the most desirable manner, the system must detect that a call has been answered in order to terminate the calls to the other telephones (or other end units). Accordingly, some form of answer supervision must be present. Answer supervision is implemented inside the PSTN but generally not available to private networks (e.g., PABXs). Since SS7 signaling supports answer supervision, it is easy for this branch calling feature to be provided through TAC 10 since TAC 10 is connected inside the PSTN.

Prior art systems without answer supervision must call each forwarding number sequentially, whereby after a certain number of preprogrammed rings, the calling stops and the next number is called until someone answers the phone. Because a ringing time-out must occur before the next call can be tried, an unrealistically long delay can occur before the call is placed to the proper telephone and finally answered. In contrast, the present invention allows TAC 10 to ring all the numbers simultaneously so the call can be answered quickly.

It is desirable that the answer supervision signaling not be delayed so that the calling and called parties may be connected quickly when the call is answered and so that during the delay time two parties do not answer two different ringing phones.

Figure 10:
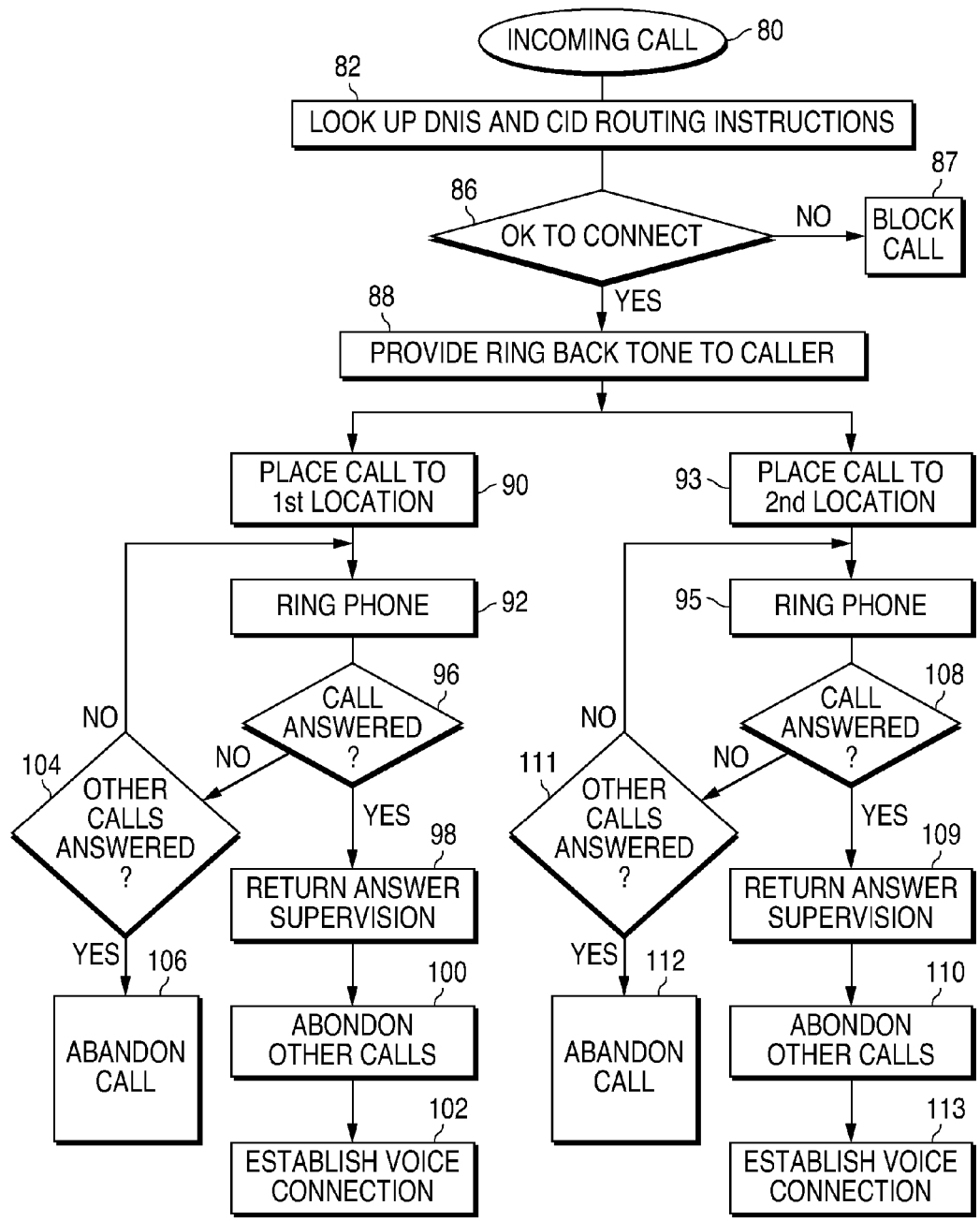
FIG. 10 is a flowchart of possible scenarios using the branch calling feature.

FIG. 10 is a flowchart of some scenarios in branch calling, whereby an incoming call to TAC 10 causes TAC 10 to place at least two new calls simultaneously and, when one of these phones is answered, the remaining calls are abandoned.

In step 80 of FIG. 10, TAC 10 receives an incoming call.

In step 82, TAC 10 looks up the routing instructions for the DNIS (Dialed Number Identification Service) and caller ID (if any). The DNIS identifies the number that was called, and the caller ID (CID) identifies the calling telephone number and sometimes the caller. DNIS works by transmitting the touch tone digits to TAC 10. A subscriber for TAC 10 may program TAC 10, as previously described, to perform any number of functions based upon the DNIS number, the CID, the time of day, or based upon any other factor. Such instructions may be stored in a look-up table addressed by the subscriber's public phone number (identified by the DNIS number). Since multiple subscribers will be using the same TAC 10, TAC 10 needs to know what number was dialed in order to perform the function on the call selected by the subscriber.

In step 86, TAC 10 identifies the features to apply to the incoming call. If the instructions are to block the call, then TAC 10 blocks the call in step 87. In the present example, it is assumed that the feature the subscriber wants to apply is a branch calling feature where two telephone numbers are to be called by TAC 10.

In step 88, TAC 10 generates a ring back tone to the caller to indicate that a telephone is ringing.

In step 90, TAC 10 places a call to a first telephone number, which causes the called phone to ring (step 92). Parallel operations are performed for a second phone number in steps 93 and 95.

In step 96, it is determined by TAC 10 whether the first phone has been answered using answer supervision signaling provided by SS7 (step 98).

In response to the answer supervision signaling, TAC 10 abandons the other call to the second telephone (step 100).

In step 102, TAC 10 completes the phone call by connecting the calling party to the answered telephone. This process may be applied to other than telephones, such as computers or other types of communication equipment.

In step 96, if the call is not answered after the ring, it is determined whether the other telephone has been answered (step 104). If not, the two phones continue to ring.

If it is determined in step 104 that another telephone has been answered (i.e., the answer supervision signal has been received by TAC 10), the call to the first telephone is abandoned (step 106).

The same operation is performed with respect to the second telephone call in steps 108-113.

Any number of telephone calls may be simultaneously placed by TAC 10 in response to a branch calling instruction.

In step 86, if the instructions programmed by the subscriber are to block the call, then TAC 10 blocks the call in step 87.

While particular embodiments of the present invention have been shown and described, it will be obvious to those skilled in the art that changes and modifications may be made without departing from this invention in its broader aspects and, therefore, the appended claims are to encompass within their scope all such changes and modifications that fall within the true spirit and scope of this invention.

What is claimed is:

1. A method performed by a web-enabled processing system connected to operate at least in part with a communication network comprising edge switches for routing calls from and to subscribers within a local geographic area and switching facilities for routing calls to other edge switches or other switching facilities local or in other geographic areas, the method comprising the steps of:

receiving a call in response to a calling party entering a first number, using a communications device, intended for a subscriber, the web-enabled processing system coupled to at least one switching facility of the communication network, the web-enabled processing system processing the call pursuant to at least one calling feature designated by said subscriber, where the at least one calling feature had previously been communicated to the web-enabled processing system by said subscriber via the internet;

placing at least two calls simultaneously to at least two different communications devices designated by the subscriber;

detecting that the call has been answered at one of the communications devices; and in response to the detecting, abandoning other calls to the remaining one or more communications devices and establishing a connection between the calling party's communications device and the answered communications device.

2. The method of claim 1 further comprising:

detecting first information about the source of the call;

associating the first information with a calling feature, previously selected by the subscriber to be performed on the call, the calling feature being to forward the call to at least two communications devices; and simultaneously placing at least two calls to at least two communications devices.

3. The method of claim 1 wherein the at least two calls to the communications devices are any combination of local call, long distance call, cellular call, and VOIP call.

4. The method of claim 1 wherein, when one of the calls to the communications devices is answered, an answer supervision signal is transmitted to the processing system, and the processing system abandons the other calls.

5. The method of claim 4 wherein the answer supervision is pursuant to the SS7 signaling protocol.

6. The method of claim 1 wherein the web-enabled processing system is connected to the switching facility, which is a PSTN tandem switch within the communication network, which is a public switched telephone network (PSTN), and wherein receiving a call from a calling party comprises the steps of:

receiving a first call through the tandem switch from the calling party intended for the subscriber after the calling party has entered a first telephone number, the first telephone number being the subscriber's public telephone number, said processing system simultaneously placing at least second and third calls using second and third telephone numbers different from the first telephone number.

7. A controller connected within the public switched telephone network (PSTN) and configured to perform enhanced routing operations, comprising:

a processing system connected within the PSTN and linked via the interne for selecting at least one calling feature, the processing system configured to perform the steps of:

receiving a call from a calling party, using a communications device, intended for a subscriber, whereby said processing system implements a calling feature previously designated by said subscriber via the internet;

placing at least two calls simultaneously to at least two different communications devices previously designated by the subscriber;

detecting that the call has been answered at one of the communications devices; and in response to the detecting, abandoning other calls to the remaining one or more communications devices and establishing a connection between the calling party's communications device and the answered communications device.

8. The controller of claim 7 wherein the processing system is configured to perform the process comprising the additional steps of:

detecting first information about the source of the call;

associating the first information with a feature, selected by the subscriber, to be performed on the call, the feature being to forward the call to the at least two different communications devices; and simultaneously placing the at least two calls to the at least two different communications devices.

9. The controller of claim 7 wherein the at least two calls to the communications devices are any combination of local call, long distance call, cellular call, and VOIP call.

10. The controller of claim 7 wherein, when one of the calls to the communications devices is answered, an answer supervision signal is transmitted to the processing system, and the processing system abandons the other calls.

11. The controller of claim 7 wherein the processing system is connected to a PSTN tandem switch within the PSTN, and wherein receiving a call from a calling party comprises the step of:

receiving a first call through the tandem switch from the calling party intended for the subscriber after the calling party has entered a first telephone number, the first telephone number being the subscriber's public telephone number, said processing system simultaneously placing at least second and third calls using second and third telephone numbers different from the first telephone number.

12. The controller of claim 7 wherein the processing system is connected to the PSTN in the subscriber's local service area.

13. The controller of claim 7 wherein the subscriber is a subscriber of residential telephone service.

14. The controller of claim 7 wherein the subscriber is a subscriber of business telephone service.

15. A method performed by a processing system coupled to a switching facility for routing calls to edge switches or other switching facilities in local or other geographic areas, within a communication network, comprising the steps of:

placing at least two calls simultaneously to at least two different communications devices designated by a subscriber using a communications device, the processing system processing the calls pursuant to at least one calling feature designated by said subscriber, where the at least one calling feature had previously been communicated to the processing system by said subscriber via the internet;

receiving the at least two calls made simultaneously to said at least two different communications devices designated by said subscriber via the internet;

detecting that one of the calls has been answered at one of the communications devices; and in response to the detecting, abandoning other calls to the remaining one or more communications devices and establishing a connection between said subscriber's communications device and the answered communications device.

16. A controller connected to a tandem switch within the public switched telephone network (PSTN) comprising:

a processing system linked to the internet for allowing a subscriber to select at least one calling feature over the web, the processing system configured to perform the process comprising the steps of:

placing at least two calls simultaneously to at least two different communications devices designated by a subscriber using a communications device, the processing system processing the calls pursuant to at least one calling feature designated by said subscriber, where the at least one calling feature had previously been communicated to the processing system by said subscriber via the internet;

receiving at least two calls made simultaneously to said at least two different communications devices designated by the subscriber via the internet;

detecting that the call has been answered at one of the communications devices; and in response to the detecting, abandoning other calls to the remaining one or more communications devices and establishing a connection between the calling party's communications device and the answered communications device.

17. A controller connected to a switching facility allowing access to local and other geographic areas within the public switched telephone network (PSTN) comprising:

a processing system linked to the internet for allowing a subscriber to select at least one calling feature via the internet, the processing system configured to perform the process comprising the steps of:

receiving a call under the control of said controller from a calling party, using a communications device, intended for a subscriber, the processing system processing the call pursuant to at least one calling feature designated by said subscriber, where the at least one calling feature had previously been communicated to the processing system by said subscriber via the internet;

invoking the at least one calling feature prior to said received call reaching a terminating central office, said at least one calling feature placing at least two calls simultaneously to at least two different communications devices previously designated by said subscriber;

detecting that one of at least two calls has been answered at one of the communications devices; and in response to the detecting, abandoning other calls to the remaining one or more communications devices and establishing a connection between the calling party's communications device and the answered communications device.

18. A method for processing an incoming call from a switching facility on a communication network that comprises edge switches for routing calls to subscribers within a local geographic area and switching facilities for routing calls to edge switches, or other switching facilities local or in other geographic areas the method comprising the steps of:

receiving a first call, which is intended for a specified recipient, at a controlling device in communication with the switching facility;

identifying one or more control criteria previously associated with the specified recipient, wherein the one or more control criteria was entered via a web-based interface;

initiating a second call at the controlling device in accordance with the control criteria associated with the specified recipient; and connecting the first and second calls at the controlling device after the second call is received by a communication device associated with the specified recipient.

19. A method as defined in claim 18, wherein the communication network comprises any one or more of a switched network, a packet-based network, and a wireless network.

20. A method as defined in claim 18, wherein the communication device is a digital device.

21. A method as defined in claim 18, wherein the controlling device is implemented using a distributed architecture spanning at least two locations.

22. A method as defined in claim 18, wherein the controlling device utilizes a programmed processor utilizing the TDM architecture.

23. A method as defined in claim 18, wherein the controlling device utilizes a programmed processor utilizing packet switching.

24. A method as defined in claim 18, wherein the controlling device utilizes a programmed processor utilizing a voice over IP (VoIP) architecture.

25. A method as defined in claim 18, wherein at least one of the first and second calls is facilitated via a VoIP connection.

26. A method as defined in claim 18, wherein at least either of the first call or the second call is routed within the communication network.

27. A method as defined in claim 18, wherein both the first and second calls are facilitated via VoIP connections.

28. A method as defined in claim 18, wherein the controlling device is located within a local service area corresponding to the specified recipient.

29. A method as defined in claim 18, wherein the controlling device is configured as a tandem access controller.

30. A method as defined in claim 29, wherein the tandem access controller is coupled to and operates in conjunction with at least one of the switching facilities located within the communication network.

31. A method as defined in claim 18, wherein both the first and second calls are routed within the communication network.

32. A method as defined in claim 18, wherein at least either one of the first and second calls is facilitated over a wireless link.

33. A method as defined in claim 18, wherein the communication network may use any one of a wired telephone device, a computing device, a wireless device, a cellular device, a portable device with cellular capability, and an information appliance.

34. A method as defined in claim 18, wherein the communication network comprises a network of switching facilities performing a class 4 switching function.

35. A method as defined in claim 18, wherein the communication network comprises a network of class 4 switches.

36. A method as defined in claim 18, where the control criteria are executed by the controlling device to perform one or more of the following operations:

a) Web-Based Telecom Navigator;
b) Manage Incoming Call Control;
c) Conditional Call Blocking/Forwarding/Alerting; Call Screening/Retrieval from Voice Mail;
d) Interactive Voice Response and Speech Recognition;
e) Manage Outgoing Call Control;
f) Click-to-Dial Calling;
g) Group Calling and Messaging;
h) Web-Based Billing;
i) Cost-Effective Single Phone Number Access;
j) Free Local Calls, Incoming Calls (not 800 Toll Service);
k) Retain Current Number (Local Number Portability);
l) Low-Cost Calling Throughout LATA;
m) Flat-Rate Foreign Exchange;
n) Standard DTMF and VoIP Phones;
o) Centralized and Consistent Personal Data;
p) Private/Public Phone Directories and Calendars;
q) "Post-It" Style Annotation of Numbers;
r) Web Dialing;
s) Click-to-Dial from Web Pages, Directories, Calendars; Multiple Phone List Management; Voice Mail Access, Prompts, Alert Via Web; Mode-Based Definition and Selection, comprising Time-of-Day, Day-of-Week, Follow-Me, Caller Recognition/Password, Caller ID, Vacation, Dinner Time, Go Away, Family Call Waiting; Learning Modes; Automatic Data Capture; Build Phone List Based on Collected Usage Information; VoIP Link Degradation Detection; and Automatic Cutover to the public switched communication network.

37. A method for processing an incoming call from a switching facility on a communication network that comprises edge switches for routing calls within a local geographic area and switching facilities for routing calls to other geographic areas, the method comprising the steps of:

receiving a first call, at a controlling device in communication with the switching facility; which is intended for a specified recipient;

identifying one or more control criteria previously associated with the specified recipient, wherein the one or more control criteria are entered via a web-based interface;

initiating a second call at the controlling device via a packet-based connection in accordance with the control criteria associated with the specified recipient; and connecting the first and second calls at the controlling device after the second call is received by a communication device associated with the specified recipient.

38. A method as defined in claim 37, wherein the specified recipient uses a communication device in communication with the controlling device via a web interface by which the specified recipient can view the status of calls or features designations.

39. A method as defined in claim 38, wherein the communication device is any one of a wired telephone device, a computing device, a wireless device, a cellular device, a portable device with cellular capability, a digital device, and an information appliance.

40. A method as defined in claim 37, wherein the control criteria are executed by the controlling device to perform one or more of the following operations:
   a) Web-Based Telecom Navigator;
   b) Manage Incoming Call Control;
   c) Conditional Call Blocking/Forwarding/Alerting; Call Screening/Retrieval from Voice Mail;
   d) Interactive Voice Response and Speech Recognition;
   e) Manage Outgoing Call Control;
   f) Click-to-Dial Calling;
   g) Group Calling and Messaging;
   h) Web-Based Billing;
   i) Cost-Effective Single Phone Number Access;
   j) Free Local Calls, Incoming Calls (not 800 Toll Service);
   k) Retain Current Number (Local Number Portability);
   l) Low-Cost Calling throughout LATA;
   m) Flat-Rate Foreign Exchange;
   n) Standard DTMF and VoIP Phones;
   o) Centralized and Consistent Personal Data;
   p) Private/Public Phone Directories and Calendars;
   q) "Post-It" Style Annotation of Numbers;
   r) Web Dialing;
   s) Click-to-Dial from Web Pages, Directories, Calendars; Multiple Phone List Management; Voice Mail Access, Prompts, Alert Via Web; Mode-Based Definition and Selection, comprising Time-of-Day, Day-of-Week, Follow-Me, Caller Recognition/Password, Caller ID, Vacation, Dinner Time, Go Away, Family Call Waiting; Learning Modes; Automatic Data Capture; Build Phone List Based on Collected Usage Information; VoIP Link Degradation Detection; and Automatic Cutover to the public switched communication network.

41. A method as defined in claim 37, wherein the packet-based connection includes a VOIP connection.

42. A method for processing an incoming call from a switching facility on a communication network that comprises edge switches for routing calls within a local geographic area and switching facilities for routing calls to other geographic areas, the method comprising the steps of:
   receiving a first call, which is intended for a specified recipient, at a controlling device in communication with the switching facility;
   identifying one or more control criteria previously associated with the specified recipient, wherein the one or more control criteria are previously entered via a web-based interface; and
   initiating one or more calls at the controlling device in accordance with the control criteria associated with the specified recipient; and
   if the one or more calls are not answered by the specified recipient, routing the first call from the controlling device to a voicemail server.

43. A method as defined in claim 42, wherein the communication network comprises a network of switching facilities performing a class 4 switching function.

44. A method as defined in claim 42, wherein the communication network comprises a network of class 4 switches.

45. A method for processing an incoming call from a switching facility on a communication network that comprises edge switches for routing calls within a local geographic area and switching facilities for routing calls to other geographic areas, the method comprising the steps of:
   receiving a first call, which is intended for a specified recipient, at a controlling device in communication with the switching facility;
   identifying one or more control criteria previously associated with the specified recipient, wherein the one or more control criteria are entered via a web-based interface; and
   routing the first call from the controlling device to a voicemail server in accordance with the control criteria associated with the specified recipient.

46. A method for processing an incoming call from a switching facility on a communication network that comprises edge switches for routing calls within a local geographic area and switching facilities for routing calls to other geographic areas, the method comprising the steps of:
   receiving a first call, which is intended for a specified recipient, at a controlling device in communication with one of the switching facilities;
   identifying a control criteria previously associated with the specified recipient, wherein the control criteria is previously entered via a web-based interface and instructs the controlling device to block calls for the specified recipient; and
   blocking the first call received at the controlling device in accordance with the control criteria.

* * * * *